US012673427B2

(12) United States Patent
Hong et al.

(10) Patent No.: US 12,673,427 B2
(45) Date of Patent: Jul. 7, 2026

(54) PROBABILISTIC APPROACH TO UNIFYING REPRESENTATIONS FOR ROBOTIC MAPPING

(71) Applicant: SAMSUNG ELECTRONICS CO., LTD., Suwon-si (KR)

(72) Inventors: Jungseok Hong, Minneapolis, MN (US); Suveer Garg, New York, NY (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 18/243,422

(22) Filed: Sep. 7, 2023

(65) Prior Publication Data

US 2024/0091950 A1     Mar. 21, 2024

Related U.S. Application Data

(60) Provisional application No. 63/407,558, filed on Sep. 16, 2022.

(51) Int. Cl.
*B25J 9/16*          (2006.01)
*G06T 7/11*          (2017.01)
(Continued)

(52) U.S. Cl.
CPC ........... *B25J 9/1697* (2013.01); *B25J 9/1612* (2013.01); *G06T 7/11* (2017.01); *G06T 7/50* (2017.01);
(Continued)

(58) Field of Classification Search
CPC ........ B25J 9/1697; B25J 9/1612; B25J 9/163; G06T 7/11; G06T 7/50; G06T 7/60;
(Continued)

(56) References Cited

U.S. PATENT DOCUMENTS 9,589,368 B2    3/2017  Qureshi et al.
10,380,755 B2   8/2019  Mulukutla et al.
(Continued)

FOREIGN PATENT DOCUMENTS

CN          113205466 A      8/2021
KR       10-2393345 B1       5/2022
(Continued)

OTHER PUBLICATIONS

CenterSnap: Single-Shot Multi-Object 3D Shape Reconstruction and Categorical 6D Pose and Size Estimation Muhammad Zubair Irshad*+, Thomas Kollart, Michael Laskeyt, Kevin Stonet, Zsolt Kira (Year: 2022).*

(Continued)

*Primary Examiner* — Harry Y Oh
(74) *Attorney, Agent, or Firm* — Sughrue Mion, PLLC

(57) ABSTRACT

The present disclosure provides methods, apparatuses, and computer-readable mediums for evaluating a reliability of three-dimensional shape predictions. In some embodiments, a method includes obtaining a scene representation including one or more images, estimating semantic information of partially-observed objects in the scene representation, based on geometric information extracted from the one or more images, determining segmented pointclouds of the partially-observed objects based on the semantic information and the geometric information, creating metric embeddings of the segmented pointclouds corresponding to the partially-observed objects, predicting completed shape pointclouds of the partially-observed objects, generating, using a probabilistic machine learning model, confidence scores for each point of the completed shape pointclouds, based on a correlation between the geometric information and the semantic information, and controlling a motion of a robot based on the (Continued)

confidence scores for each point of the completed shape pointclouds.

20 Claims, 10 Drawing Sheets

(51) Int. Cl.

| | |
|---|---|
| *G06T 7/50* | (2017.01) |
| *G06T 7/60* | (2017.01) |
| *G06T 7/70* | (2017.01) |
| *G06V 10/776* | (2022.01) |
| *G06V 10/82* | (2022.01) |
| *G06V 20/10* | (2022.01) |
| *G06V 20/50* | (2022.01) |
| *G06V 20/64* | (2022.01) |
| *G06V 20/70* | (2022.01) |

(52) U.S. Cl.
CPC .................. *G06T 7/60* (2013.01); *G06T 7/70* (2017.01); *G06V 10/776* (2022.01); *G06V 20/50* (2022.01); *G06V 20/70* (2022.01); *G06T 2207/10028* (2013.01); *G06T 2207/20021* (2013.01); *G06T 2207/20076* (2013.01); *G06T 2207/20081* (2013.01)

(58) Field of Classification Search
CPC ............. G06T 7/70; G06T 2207/10028; G06T 2207/20021; G06T 2207/20076; G06T 2207/20081; G06T 2207/20084; G06T 5/50; G06T 5/77; G06T 2207/10024; G06T 2207/30108; G06V 10/776; G06V 20/50; G06V 20/70; G06V 10/82; G06V 20/653; G06V 20/10; G05B 2219/39543; G05B 2219/40564; G05B 2219/40584
See application file for complete search history.

(56) References Cited

U.S. PATENT DOCUMENTS

| | | | |
|---|---|---|---|
| 12,097,627 B2 | 9/2024 | Fu et al. | |
| 2014/0052555 A1* | 2/2014 | Macintosh ............... | G07G 1/12 |
| | | | 705/23 |
| 2018/0144493 A1* | 5/2018 | Mulukutla .............. | G06T 17/10 |
| 2020/0273138 A1* | 8/2020 | Chavez .................. | G06T 7/174 |
| 2022/0156536 A1 | 5/2022 | Oh et al. | |
| 2022/0292717 A1* | 9/2022 | Tan ........................... | G06T 7/50 |

FOREIGN PATENT DOCUMENTS

| | | | |
|---|---|---|---|
| WO | 2021/149429 A1 | 7/2021 | |
| WO | 2022/116677 A1 | 6/2022 | |
| WO | 2022/243337 A2 | 11/2022 | |

OTHER PUBLICATIONS

International Search Report and Written Opinion issued Dec. 12, 2023 by the International Searching Authority in International Patent Application No. PCT/KR2023/013970 (PCT/ISA/220, PCT/ISA/210 and PCT/ISA/237).

M. Z. Irshad, T. Kollar, M. Laskey, K. Stone, and Z. Kira, "Centersnap: Single-shot multi-object 3d shape reconstruction and categorical 6d pose and size estimation," 2022. [Online]. Available:https://arxiv.org/abs/2203.01929.

* cited by examiner

900

OBTAINING A SCENE REPRESENTATION COMPRISING ONE OR MORE IMAGES, EACH IMAGE OF THE ONE OR MORE IMAGES COMPRISING DEPTH INFORMATION ⌇⌇ 910

ESTIMATING SEMANTIC INFORMATION OF PARTIALLY-OBSERVED OBJECTS IN THE SCENE REPRESENTATION, BASED ON GEOMETRIC INFORMATION EXTRACTED FROM THE ONE OR MORE IMAGES ⌇⌇ 920

DETERMINING SEGMENTED POINTCLOUDS OF THE PARTIALLY-OBSERVED OBJECTS IN THE SCENE REPRESENTATION BASED ON THE SEMANTIC INFORMATION AND THE GEOMETRIC INFORMATION ⌇⌇ 930

CREATING METRIC EMBEDDINGS OF THE SEGMENTED POINTCLOUDS CORRESPONDING TO THE PARTIALLY-OBSERVED OBJECTS OF THE SCENE REPRESENTATION ⌇⌇ 940

PREDICTING COMPLETED SHAPE POINTCLOUDS OF THE PARTIALLY-OBSERVED OBJECTS OF THE SCENE REPRESENTATION ⌇⌇ 950

GENERATING, USING A PROBABILISTIC MACHINE LEARNING MODEL, CONFIDENCE SCORES FOR EACH POINT OF THE COMPLETED SHAPE POINTCLOUDS, BASED ON A CORRELATION BETWEEN THE GEOMETRIC INFORMATION AND THE SEMANTIC INFORMATION ⌇⌇ 960

CONTROLLING A MOTION OF A ROBOT BASED ON THE CONFIDENCE SCORES FOR EACH POINT OF THE COMPLETED SHAPE POINTCLOUDS ⌇⌇ 970

FIG. 9

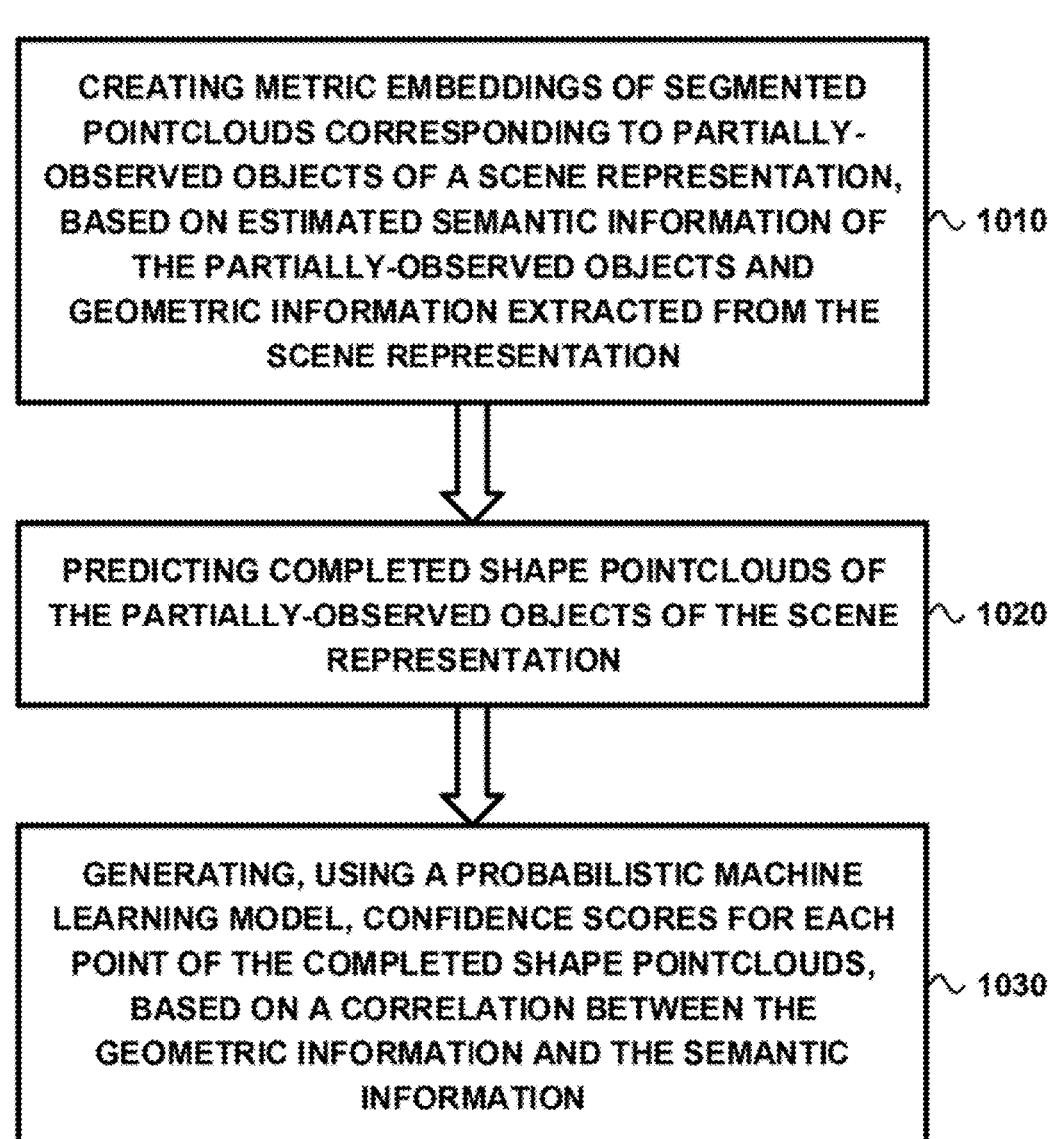

CREATING METRIC EMBEDDINGS OF SEGMENTED POINTCLOUDS CORRESPONDING TO PARTIALLY-OBSERVED OBJECTS OF A SCENE REPRESENTATION, BASED ON ESTIMATED SEMANTIC INFORMATION OF THE PARTIALLY-OBSERVED OBJECTS AND GEOMETRIC INFORMATION EXTRACTED FROM THE SCENE REPRESENTATION ~ 1010

PREDICTING COMPLETED SHAPE POINTCLOUDS OF THE PARTIALLY-OBSERVED OBJECTS OF THE SCENE REPRESENTATION ~ 1020

GENERATING, USING A PROBABILISTIC MACHINE LEARNING MODEL, CONFIDENCE SCORES FOR EACH POINT OF THE COMPLETED SHAPE POINTCLOUDS, BASED ON A CORRELATION BETWEEN THE GEOMETRIC INFORMATION AND THE SEMANTIC INFORMATION ~ 1030

FIG. 10

PROBABILISTIC APPROACH TO UNIFYING REPRESENTATIONS FOR ROBOTIC MAPPING

CROSS-REFERENCE TO RELATED APPLICATIONS

This application claims benefit of priority under 35 U.S.C. § 119 to U.S. Provisional Patent Application No. 63/407,558, filed on Sep. 16, 2022, in the U.S. Patent and Trademark Office, the disclosure of which is incorporated by reference herein in its entirety.

BACKGROUND

Field

The present disclosure relates generally to robotic mapping and control, and more particularly to methods, apparatuses, and non-transitory computer-readable mediums for evaluating a reliability of three-dimensional (3D) shape predictions.

Description of Related Art

According to high demand for performing more complex robotic tasks, an ability to map a robot's environment with both semantic and geometric information may have increased in significance. That is, without a semantic and/or geometric understanding of its surroundings, a robot may be unable to perform tasks such as, but not limited to, autonomous driving, home assistance, navigating through a complex environment (e.g., a warehouse), and the like. For example, home assistance robots with manipulation capabilities and/or warehouse robots executing pick and place operations may need to perceive the full environment surrounding the robot in order to work seamlessly, even in the presence of occlusions and/or visual obstructions.

When only a partial and/or obstructed view of an object is available in such environments, shape completion may be used to predict the complete shape of the partially-observable object. With the predicted completed shape of the object, the robot may plan a motion to conduct a task (e.g., grasping, pushing, pulling, and the like). However, in order to conduct these tasks reliably, the robot may need to assess the uncertainty of each predicted point from the completed shape of the object. That is, the robot may need to decide which points of the predicted shape are more likely to be accurate, and as such, be useful in planning the motion needed to conduct the task reliably.

However, related techniques in robotic mapping may be optimized for reconstruction quality, and as such, may not provide uncertainty information, may only provide uncertainty information for a scene as a whole, and/or may only provide uncertainty information for objects as a whole. Consequently, reliance on the mapping information produced by these related techniques may be problematic as an assessment of the uncertainty of points in the predicted shapes may be difficult to obtain.

Thus, there exists a need for further improvements to robotic mapping, as the need for performing more complex robotic tasks may be constrained by an inability to assess the uncertainty of a robot's mapped surroundings. Improvements are presented herein. These improvements may also be applicable to other computer vision and/or mapping technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for evaluating a reliability of three-dimensional (3D) shape predictions are disclosed by the present disclosure. Aspects of the present disclosure provide for performing robotic mapping and/or controlling a robot based on the reliability of the 3D shape predictions.

According to an aspect of the present disclosure, a method for controlling robot motion, to be performed by a processor, is provided. The method includes obtaining a scene representation including one or more images. Each image of the one or more images includes depth information. The method further includes estimating semantic information of partially-observed objects in the scene representation, based on geometric information extracted from the one or more images. The method further includes determining segmented pointclouds of the partially-observed objects in the scene representation based on the semantic information and the geometric information. The method further includes creating metric embeddings of the segmented pointclouds corresponding to the partially-observed objects of the scene representation. The method further includes predicting completed shape pointclouds of the partially-observed objects of the scene representation. The method further includes generating, using a probabilistic machine learning model, confidence scores for each point of the completed shape pointclouds, based on a correlation between the geometric information and the semantic information. The probabilistic machine learning model has been trained using training data including the metric embeddings of the segmented pointclouds. The method further includes controlling a motion of a robot based on the confidence scores for each point of the completed shape pointclouds.

In some embodiments, the processor may be included in the robot, and the partially-observed objects of the scene representation may include a target object. In such embodiments, the controlling of the motion of the robot may include controlling at least one of an arm and an end-effector of the robot to enable the robot to grab the target object.

In some embodiments, the processor may be included in an external device that may be provided separately from the robot, and the partially-observed objects of the scene representation may include a target object. In such embodiments, the controlling of the motion of the robot may include transmitting, to the robot, motion control parameters of at least one of an arm and an end-effector of the robot, that may cause the robot to grab the target object based on the motion control parameters.

In some embodiments, the probabilistic machine learning model may be a Gaussian process model, and the partially-observed objects of the scene representation may include a target object. In such embodiments, the generating of the confidence scores may include generating the confidence scores based on at least one of object properties which indicates whether the target object is fragile and a past robot experience indicating whether the robot previously handled the target object.

In some embodiments, the partially-observed objects of the scene representation may include a target object. In such embodiments, the method may further include identifying a region of the target object that may have a number of data points in the completed shape pointclouds with corresponding confidence scores lower than a predetermined threshold, and controlling the robot to capture at least one other image of the region of the target object.

In some embodiments, the obtaining of the scene representation may include obtaining the one or more images from a first camera location. In such embodiments, the method may further include filtering out, from the completed shape pointclouds, points having a corresponding confidence score that may fail to meet a threshold confidence score, resulting in filtered points of the completed shape pointclouds, and determining, based on the filtered points of the completed shape pointclouds, a second camera location, different from the first camera location, from which to obtain at least one other image of the scene representation that may include at least one partially-observed portion of the partially-observed objects of the scene representation.

In some embodiments, the method may further include adjusting the threshold confidence score based on updated confidence scores of the at least one other image.

In some embodiments, the determining of the segmented pointclouds may include extracting the geometric information from image data and the depth information of the one or more images, estimating the semantic information for each pixel of the one or more images, using the geometric information, determining an estimation confidence score of the semantic information for each pixel of the one or more images, and combining the semantic information with the depth information, resulting in the segmented pointclouds.

In some embodiments, the determining of the segmented pointclouds may include maintaining a semantic map of the segmented pointclouds that may include the semantic information of the partially-observed objects of the scene representation, and tracking the partially-observed objects between a first image of the one or more images and a second image of the one or more images, using the semantic information. The semantic information may include a semantic class assigned to each of the partially-observed objects.

In some embodiments, the creating of the metric embeddings of the segmented pointclouds may include providing, to a transformer model, the segmented pointclouds, to obtain embeddings of the segmented pointclouds, and providing, to a perceptron model, the embeddings of the segmented pointclouds to obtain the metric embeddings of the segmented pointclouds. The embeddings of the segmented pointclouds may include the semantic information and the geometric information of the segmented pointclouds. The metric embeddings of the segmented pointclouds may have been forced into a unit-sphere metric space.

In some embodiments, the creating of the metric embeddings of the segmented pointclouds may further include assigning a zero embedding to free space in the metric embeddings of the segmented pointclouds.

In some embodiments, the predicting of the completed shape pointclouds may include providing, to a shape completion model, the one or more images including image data and the depth information, obtaining, from the shape completion model, shape reconstructions of the partially-observed objects of the scene representation, and transforming the shape reconstructions from the coordinate system of the image sensor to a world coordinate system, based on physical configuration information of the image sensor. The shape reconstructions may be mapped to a coordinate system of an image sensor used to obtain the one or more images.

According to an aspect of the present disclosure, an apparatus for controlling robot motion is provided. The apparatus includes a memory storing instructions, and a processor communicatively coupled the memory. The processor is configured to execute the instructions to obtain a scene representation including one or more images. Each image of the one or more images includes depth information. The processor is further configured to execute the instructions to estimate semantic information of partially-observed objects in the scene representation, based on geometric information extracted from the one or more images. The processor is further configured to execute the instructions to determine segmented pointclouds of the partially-observed objects in the scene representation based on the semantic information and the geometric information. The processor is further configured to execute the instructions to create metric embeddings of the segmented pointclouds corresponding to the partially-observed objects of the scene representation. The processor is further configured to execute the instructions to predict completed shape pointclouds of the partially-observed objects of the scene representation. The processor is further configured to execute the instructions to generate, using a probabilistic machine learning model, confidence scores for each point of the completed shape pointclouds, based on a correlation between the geometric information and the semantic information. The probabilistic machine learning model has been trained using training data including the metric embeddings of the segmented pointclouds. The processor is further configured to execute the instructions to control a motion of a robot based on the confidence scores for each point of the completed shape pointclouds.

In some embodiments, the apparatus may be included in the robot, and the partially-observed objects of the scene representation may include a target object. In such embodiments, the processor may be further configured to execute further instructions to control at least one of an arm and an end-effector of the robot to enable the robot to grab the target object.

In some embodiments, the apparatus may be included in an external device that may be provided separately from the robot, and the partially-observed objects of the scene representation may include a target object. In such embodiments, the processor may be further configured to execute further instructions to transmit, to the robot, motion control parameters of at least one of an arm and an end-effector of the robot, causing the robot to grab the target object based on the motion control parameters.

In some embodiments, the probabilistic machine learning model may be a Gaussian process model, and the partially-observed objects of the scene representation may include a target object. In such embodiments, the processor may be further configured to execute further instructions to generate the confidence scores based on at least one of object properties which indicates whether the target object is fragile and a past robot experience indicating whether the robot previously handled the target object.

In some embodiments, the partially-observed objects of the scene representation may include a target object. In such embodiments, the processor may be further configured to execute further instructions to identify a region of the target object that may have a number of data points in the completed shape pointclouds with corresponding confidence scores that may be lower than a predetermined threshold, and control the robot to capture at least one other image of the region of the target object.

In some embodiments, the processor may be further configured to execute further instructions to extract the geometric information from image data and the depth information of the one or more images, estimate the semantic information for each pixel of the one or more images, using the geometric information, determine an estimation confidence score of the semantic information for each pixel of the one or more images, and combine the semantic information with the depth information, resulting in the segmented pointclouds.

In some embodiments, the processor may be further configured to execute further instructions to provide, to a transformer model, the segmented pointclouds, to obtain embeddings of the segmented pointclouds, and provide, to a perceptron model, the embeddings of the segmented pointclouds to obtain the metric embeddings of the segmented pointclouds. The embeddings of the segmented pointclouds may include the semantic information and the geometric information of the segmented pointclouds. The metric embeddings of the segmented pointclouds may have been forced into a unit-sphere metric space.

According to an aspect of the present disclosure, an apparatus that includes means for controlling robot motion is provided. The apparatus includes means for obtaining a scene representation including one or more images. Each image of the one or more images includes depth information. The apparatus further includes means for estimating semantic information of partially-observed objects in the scene representation, based on geometric information extracted from the one or more images. The apparatus further includes means for determining segmented pointclouds of the partially-observed objects in the scene representation based on the semantic information and the geometric information. The apparatus further includes means for creating metric embeddings of the segmented pointclouds corresponding to the partially-observed objects of the scene representation. The apparatus further includes means for predicting completed shape pointclouds of the partially-observed objects of the scene representation. The apparatus further includes means for generating, using a probabilistic machine learning model, confidence scores for each point of the completed shape pointclouds, based on a correlation between the geometric information and the semantic information. The probabilistic machine learning model has been trained using training data including the metric embeddings of the segmented pointclouds. The apparatus further includes means for controlling a motion of a robot based on the confidence scores for each point of the completed shape pointclouds.

According to an aspect of the present disclosure, a non-transitory computer-readable storage medium storing computer-executable instructions for controlling robot motion is provided. The computer-executable instructions, when executed by at least one processor of a device, cause the device to obtain a scene representation including one or more images. Each image of the one or more images includes depth information. The computer-executable instructions further cause the device to estimate semantic information of partially-observed objects in the scene representation, based on geometric information extracted from the one or more images. The computer-executable instructions further cause the device to determine segmented pointclouds of the partially-observed objects in the scene representation based on the semantic information and the geometric information. The computer-executable instructions further cause the device to create metric embeddings of the segmented pointclouds corresponding to the partially-observed objects of the scene representation. The computer-executable instructions further cause the device to predict completed shape pointclouds of the partially-observed objects of the scene representation. The computer-executable instructions further cause the device to generate, using a probabilistic machine learning model, confidence scores for each point of the completed shape pointclouds, based on a correlation between the geometric information and the semantic information. The probabilistic machine learning model has been trained using training data including the metric embeddings of the segmented pointclouds. The computer-executable instructions further cause the device to control a motion of a robot based on the confidence scores for each point of the completed shape pointclouds.

According to an aspect of the present disclosure, a method of evaluating a reliability of 3D shape predictions, to be performed by a processor, is provided. The method includes creating metric embeddings of segmented pointclouds corresponding to partially-observed objects of a scene representation, based on estimated semantic information of the partially-observed objects and geometric information extracted from the scene representation. The method further includes predicting completed shape pointclouds of the partially-observed objects of the scene representation. The method further includes generating, using a probabilistic machine learning model, confidence scores for each point of the completed shape pointclouds, based on a correlation between the geometric information and the semantic information.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 9 depicts a flowchart of an example method of controlling robot motion, in accordance with various aspects of the present disclosure; and FIG. 10 illustrates a flowchart of another example method of evaluating a reliability of 3D shape predictions, in accordance with various aspects of the present disclosure.

DETAILED DESCRIPTION

Figure 1:
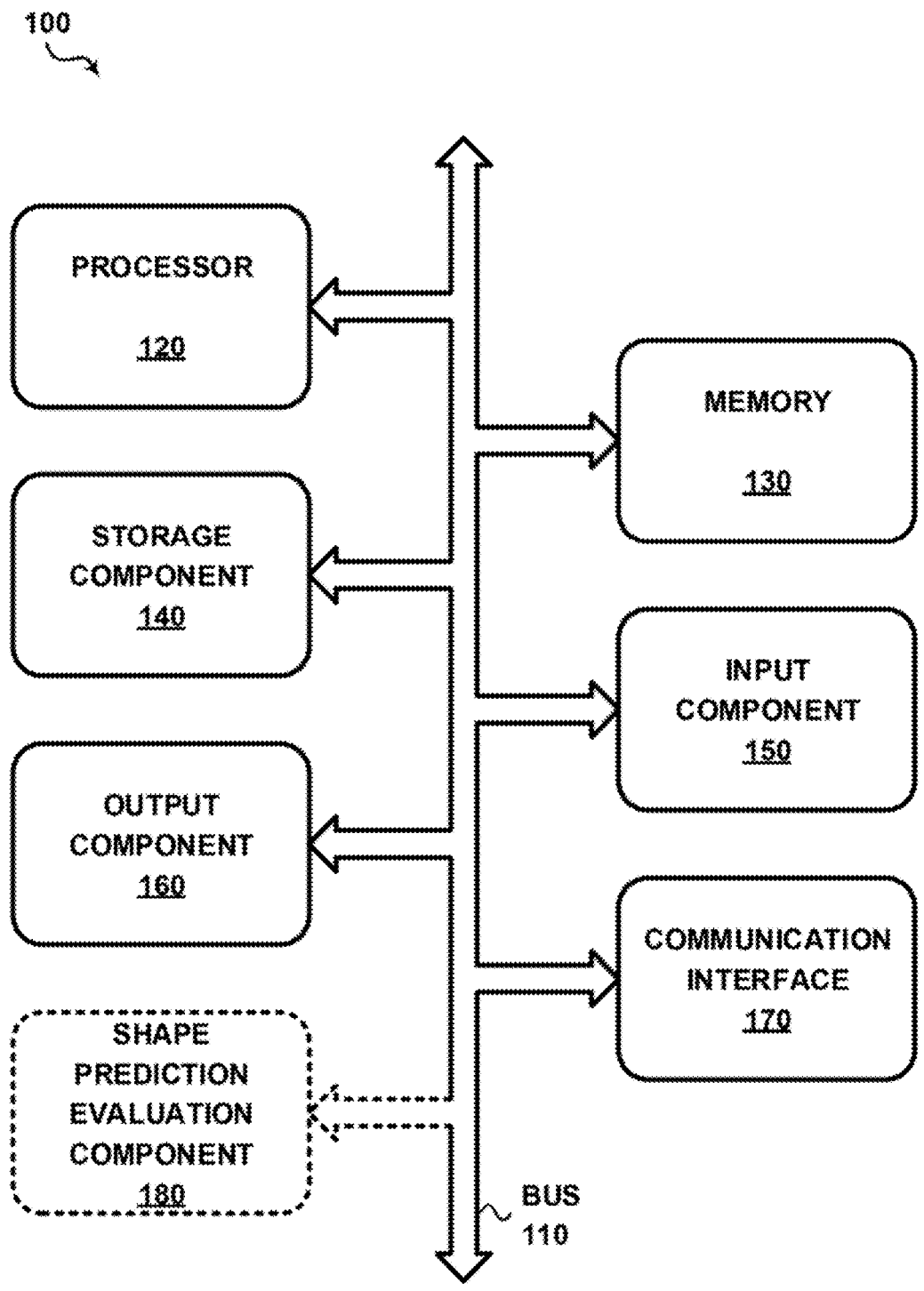
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the present disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, and non-transitory computer-readable mediums for evaluating a reliability of three-dimensional (3D) shape predictions. Aspects described herein may be used to perform robotic mapping and/or controlling a robot based on the reliability of the 3D shape predictions.

Aspects presented herein may provide for a probabilistic mapping approach for scenarios where only partial views of at least some objects in a scene may be visible. For example, aspects presented herein may provide for predicting semantic information of partially-observed objects in a scene representation, obtaining segmented pointclouds of the partially-observed objects based on the semantic information and the geometric information, and creating metric embeddings of the segmented pointclouds corresponding to the partially-observed objects. In addition, aspects described herein may provide for predicting completed shape pointclouds of the partially-observed objects. Other aspects presented herein may evaluate the uncertainty of the completed shape pointclouds with their corresponding semantic information to provide confidence scores for each point of the completed shape pointclouds of the partially-observed objects. For example, the evaluation may be performed by a probabilistic machine learning model in a relatively high dimensional space which may produce confidence metrics with a relatively high degree of quality (e.g., accuracy). Thus, aspects presented herein may be used to filter the predicted completed shapes with the confidence scores, and as such, produce environment maps with a known level of certainty. In turn, these environment maps may be used by a robot to plan a motion to conduct a task (e.g., grasping, pushing, pulling, and the like).

The aspects described herein may provide advantages over related robotic mapping techniques by providing confidence scores which may be used to evaluate the uncertainty of points of predicted shape completions across the entire scene. Aspects described herein may further provide for merging semantic and geometric information obtained from images representing a scene with predicted completed shapes to generate the confidence scores. As such, the aspects described herein may not be bound by object semantic classes, the complexity of object geometries, and/or shape completion networks. Thus, the aspects described herein may be generally applied to a wide variety of environments, scenarios, and implementations.

As noted above, certain embodiments are discussed herein that relate to evaluating a reliability of 3D shape predictions. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a robotic device, a robot controller, a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a shape prediction evaluation component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, and the shape prediction evaluation component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include one or more sensors for sensing information (e.g., a global positioning system (GPS) component, an accelerometer, a gyroscope, an actuator, a transducer, a contact sensor, a proximity sensor, a ranging device, a camera, a video camera, a depth camera, a time-of-flight (TOF) camera, a stereoscopic camera, and the like). In an embodiment, the input component 150 may include more than one of a same sensor type (e.g., multiple cameras).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an IEEE 1094 (FireWire) interface, or the like.

In some embodiments, the device 100 may include the shape prediction evaluation component 180, which may be configured to evaluate a reliability of 3D shape predictions. For example, the shape prediction evaluation component 180 may be configured to obtain a scene representation, estimate semantic information of partially-observed objects, determine segmented pointclouds of the partially-observed objects, create metric embeddings of the segmented pointclouds, predict completed shape pointclouds, generate confidence scores for the completed shape pointclouds, and control a motion of a robot.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to evaluating a reliability of 3D shape predictions.

Figure 2:
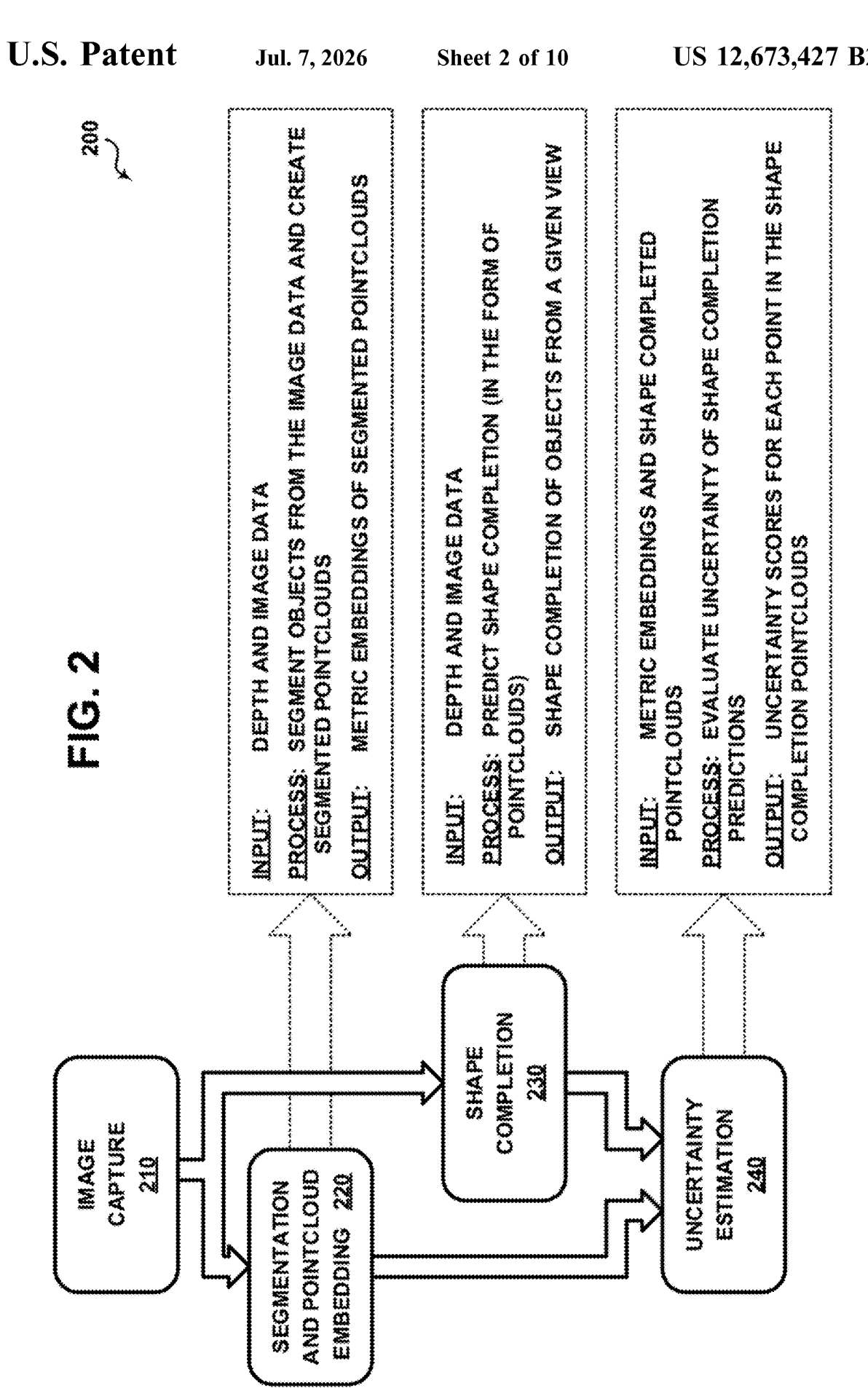
FIG. 2 illustrates an example of a process flow for evaluating a reliability of three-dimensional (3D) shape predictions, in accordance with various aspects of the present disclosure.

FIG. 2 illustrates an example of a process flow for evaluating a reliability of 3D shape predictions, in accordance with various aspects of the present disclosure. The shape prediction evaluation process 200 of FIG. 2 may include an image capture operation 210, a segmentation and pointcloud embedding operation 220, a shape completion operation 230, and an uncertainty estimation operation 240.

In some embodiments, at least a portion of the shape prediction evaluation process 200 may be performed by the device 100 of FIG. 1, which may include the shape prediction evaluation component 180. Alternatively or additionally, another computing device (e.g., a robotic device, a robot controller, a server, a laptop, a smartphone, a user equipment (UE), a wearable device, a smart device, an IoT device, and the like) that includes the shape prediction evaluation component 180 may perform at least a portion of the shape prediction evaluation process 200.

Referring to FIG. 2, in the image capture operation 210, the shape prediction evaluation process 200 may include obtaining, by a processor (e.g., processor 120 of device 100 of FIG. 1), a scene representation including one or more images. In an embodiment, the one or more images may include red-green-blue (RGB) images. Alternatively or additionally, the one or more images may include depth information. For example, the one or more images may include two-dimensional (2D) RGB images that are associated with and/or include depth information. In an optional or additional embodiment, the one or more images may be captured by the input component 150 of the device 100 of FIG. 1. For example, in such an embodiment, the input component 150 may include at least one of a camera, a video camera, a depth camera, a TOF camera, a stereoscopic camera, and the like, capable of capturing and/or providing the one or more images of the scene representation. That is, the present disclosure is not limited in this regard, and aspects presented herein may be applied with other types of image sensors. Notably, the aspects presented herein may be employed with any image sensor capable of providing image data and geometric information associated with the image data. As another example, the input component 150 may include multiple (e.g., more than one) sensors of a same type (e.g., multiple cameras). That is, in such an example, the one or more images may be captured using multiple cameras.

As shown in FIG. 2, the one or more images of the scene representation obtained by the image capture operation 210 may be provided to the segmentation and pointcloud embedding operation 220 and the shape completion operation 230.

In the segmentation and pointcloud embedding operation 220, the shape prediction evaluation process 200 may include determining segment objects from the image data (e.g., the one or more images) and creating segmented pointclouds. The segmented pointclouds may correspond to one or more objects observed in the scene representation. Alternatively or additionally, at least one object of the objects observed in the scene representation may referred to as a partially-observed object. As used herein, a partially-observed object may refer to an object included in the scene representation that may not be fully visible to the image sensor. For example, the partially-observed object may refer to an object in which at least a portion of the object is occluded by the presence of one or more visual obstructions that may prevent the image sensor from capturing the entirety of the object. Alternatively or additionally, the partially-observed object may refer to an object in which at least a portion of the object is obstructed (e.g., unseen) by the object itself. That is, the image sensor may be unable to capture a back (or far) side of the partially-observed object that may be obscured and/or obstructed by a front (or near) side of the object (e.g., when the object is opaque).

The partially-observed objects of the scene representation may include a target object. As used herein, the target object may refer to an object included in the scene that may be an intended target of the robot on which an action (e.g., grasping, pushing, pulling, and the like) may need to be performed.

The segmentation and pointcloud embedding operation 220 may further include outputting metric embeddings of the segmented pointclouds. For example, the segmentation and pointcloud embedding operation 220 may include creating metric embeddings of segmented pointclouds corresponding to partially-observed objects of a scene representation, based on a combination of estimated semantic information of the partially-observed objects and geometric information extracted from the scene representation. The segmentation and pointcloud embedding operation 220 is further described with reference to FIGS. 5 and 6.

The shape prediction evaluation process 200 may include, in the shape completion operation 230, predicting and outputting shape completion (e.g., pointclouds) of the partially-observed objects in the scene representation. For example, the shape completion operation 230 may include predicting completed shape pointclouds of the partially-observed objects of the scene representation. The shape completion operation 230 is further described with reference to FIG. 5.

The uncertainty estimation operation 240 may be provided as input the metric embeddings of the segmented pointclouds created in the segmentation and pointcloud embedding operation 220 and the shape completed pointclouds predicted in the shape completion operation 230, as shown in FIG. 2. The uncertainty estimation operation 240 may include evaluating the uncertainty of the shape completion predictions and outputting uncertainty (and/or confidence) scores for each point in the shape completion pointclouds. For example, the uncertainty estimation operation 240 may include generating, using a probabilistic machine learning model, confidence scores for each point of the completed shape pointclouds, based on a correlation between geometric information extracted from the scene representation and semantic information of the partially-observed objects. The uncertainty estimation operation 240 is further described with reference to FIGS. 5 and 7.

As described with reference to FIG. 2, aspects of the present disclosure may provide a probabilistic mapping approach for scenarios where only partial views of objects may be visible. As described herein, semantic information and shape completion information may be inferred from images including the partial views, and as such, a semantic understanding, as well as, completed shapes of observed objects may be obtained from the partial views. In addition, the reliability of these inferences may be evaluated using a classification model with metric embedding defined in a unit-sphere metric space. As a result, the semantic information and the shape completion information may be unified using the evaluated values (e.g., confidence scores). Consequently, aspects provided herein may potentially achieve more accurate predictions when compared to related approaches, and thus, provide for better estimation of scene mapping that may allow for performance of tasks in a complex environment, even in the presence of occlusions and/or visual obstructions.

Figure 3:
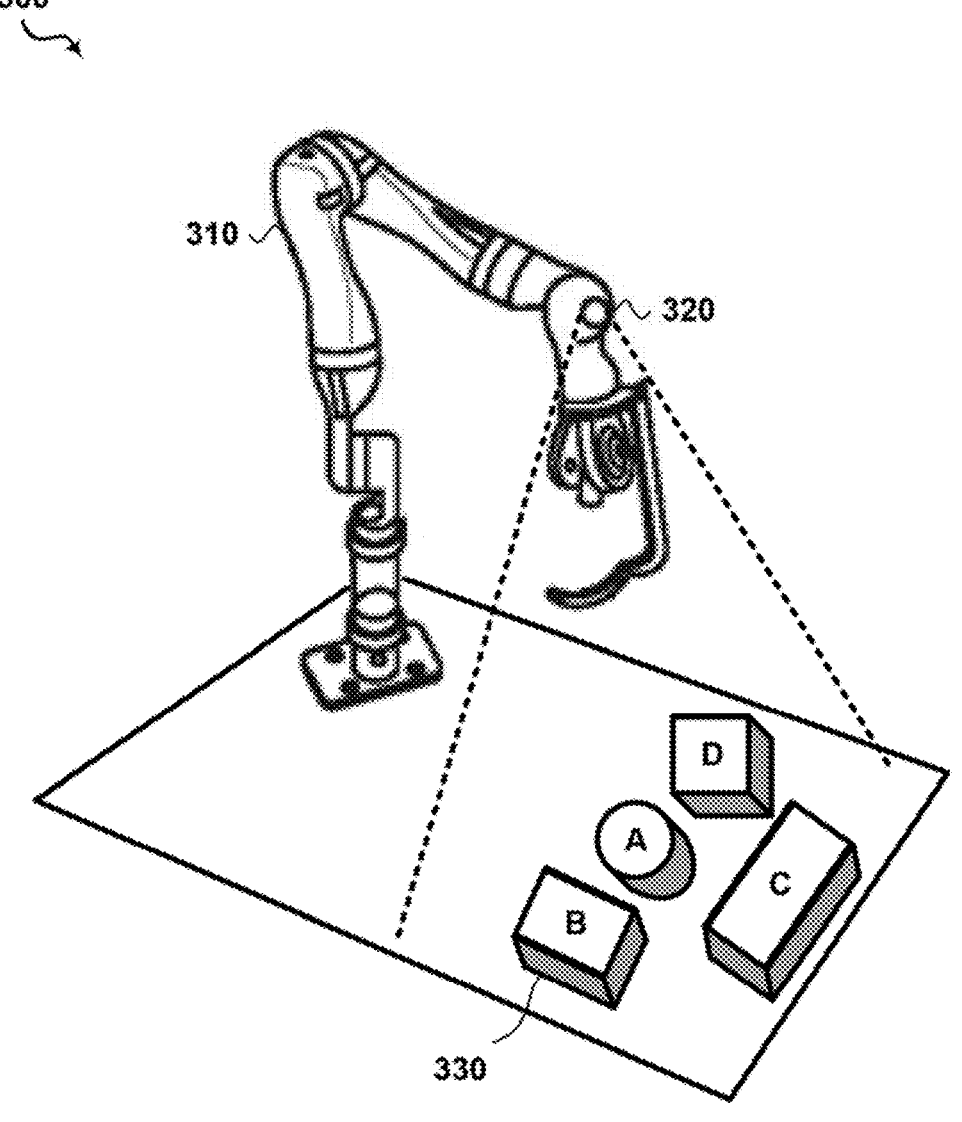
FIG. 3 depicts an example of a robot control system, in accordance with various aspects of the present disclosure.

FIG. 3 depicts an example of a robot control system, in accordance with various aspects of the present disclosure.

Referring to FIG. 3, an example of the robot control system 300 that implements one or more aspects of the present disclosure is illustrated. In some embodiments, at least a portion of the operations and/or functions of the robot control system 300 may be performed by the device 100 of FIG. 1, which may include the shape prediction evaluation component 180. Alternatively or additionally, another computing device (e.g., a robotic device, a robot controller, a server, a laptop, a smartphone, a UE, a wearable device, a smart device, an IoT device, and the like) that includes the shape prediction evaluation component 180 may perform at least a portion of the operations and/or functions of the robot control system 300.

As shown in FIG. 3, a robot 310 may observe objects (e.g., first object 330A, second object 330B, third object 330C, and fourth object 330D, hereinafter generally referred to as "330") using an image sensor 320. For example, the robot 310 may capture one or more images representing a scene that includes the objects 330. As described with reference to FIG. 2, the one or more images may include red-green-blue (RGB) images that may include depth information (e.g., RGBD images).

In an embodiment, the image sensor 320 (e.g., camera, a video camera, a depth camera, a TOF camera, a stereoscopic camera, or the like) may be provided on the robot 310. For example, the robot 310 may be and/or may include the device 100 of FIG. 1. In such an example, the image sensor 320 may be mounted on a movable portion of the robot 310, such as, but not limited to, a robotic arm (e.g., a robotic arm with seven (7) degrees-of-freedom (7DOF)), a joint of the robotic arm (e.g., a wrist of the robotic arm), an end-effector of the robot 310, and the like. In such an embodiment, the device 100 may control the motion of at least one of the robot 310, the robotic arm, and the end-effector of the robot 310 to enable the robot 310 to perform an action (e.g., grasping, pushing, pulling, and the like) on at least one target object from among the objects 330.

In an optional or additional embodiment, the image sensor 320 may be provided on the robot 310, and the device 100 may be provided on an external device that is provided separately from the robot 310 (e.g., a robot controller, a desktop computer, a computer server, a virtual machine, a network appliance, a mobile device, a wearable device, a smart device, an IoT device, and/or any other type of data processing device). In such an embodiment, the image capture operation 210 of FIG. 2 may include receiving, by the external device, the one or more images of the scene representation. Alternatively or additionally, the external device may transmit, to the robot 310, motion control parameters of at least one of an arm and an end-effector of the robot 310, that may cause the robot 310 to perform an action (e.g., grasping, pushing, pulling, and the like) based on the motion control parameters. However, the present disclosure is not limited as to the location and/or mounting configurations of the image sensor and/or the device 100. For example, in another optional or additional embodiment, the image sensor 320 and the device 100 may be provided separately from the robot 310.

In an embodiment, a first portion of the one or more images of the scene representation may be obtained at a first location, and a second portion of the one or more images may be obtained at a second location. That is, in such an embodiment, at least one first image of the one or more images may be obtained when the image sensor 320 is positioned in a first location (e.g., a first position and/or a first orientation), and at least one second image of the one or more images may be obtained when the image sensor 320 is positioned in a second location (e.g., a second position and/or a second orientation). For example, the one or more images may be obtained from different geographic locations. Alternatively or additionally, the one or more images may be obtained from different orientations of the image sensor 320 (e.g., different alignments of the image sensor relative to a specific direction). As another example, the one or more images may be obtained from same geographic locations and/or orientations.

Continuing to refer to FIG. 3, the robot 310 may observe the objects 330 in its environment through the image sensor 320. In an embodiment, the robot 310 may infer semantic segmentations of the objects 330 based on geometric information extracted from the one or more images. Alternatively or additionally, the robot 310 may determine segmented pointclouds of partially-observed objects from among the objects 330 in the scene representation based on the semantic information and the geometric information, and/or the robot 310 may create metric embeddings of the segmented pointclouds corresponding to the partially-observed objects. In an optional or additional embodiment, the robot 310 may predict completed shape pointclouds of the partially-observed objects. The robot 310 may generate confidence scores for each point of the completed shape pointclouds, based on a correlation between the geometric information and the semantic information.

In an embodiment, the robot 310 may filter shape predictions based on the confidence scores and/or use the filtered predictions to map the surroundings and/or the environment of the robot 310. Alternatively or additionally, the robot 310 may use the filtered predictions to perform an action (e.g., grasping, pushing, pulling, and the like) on at least one target object from among the objects 330.

In an optional or additional embodiment, the robot 310 may filter the shape predictions based on different thresholds based on an importance (e.g., priority) and/or risk associated with a task to be performed. For example, the robot 310 may filter the shape predictions using a relatively high confidence threshold when performing a high priority and/or high risk task. Alternatively or additionally, the robot 310 may filter the shape predictions using a relatively low confidence threshold when performing a low priority and/or low risk task. As another example, the robot 310 may filter the shape predictions after having adjusted the confidence scores based on at least one of object properties which indicates whether the object is fragile and a past robot experience indicating whether the robot 310 has previously handled the object.

For example, the robot 310 may perform a view planning process on its surroundings based on the filtered predictions, as described with reference to FIG. 4.

Figure 4:
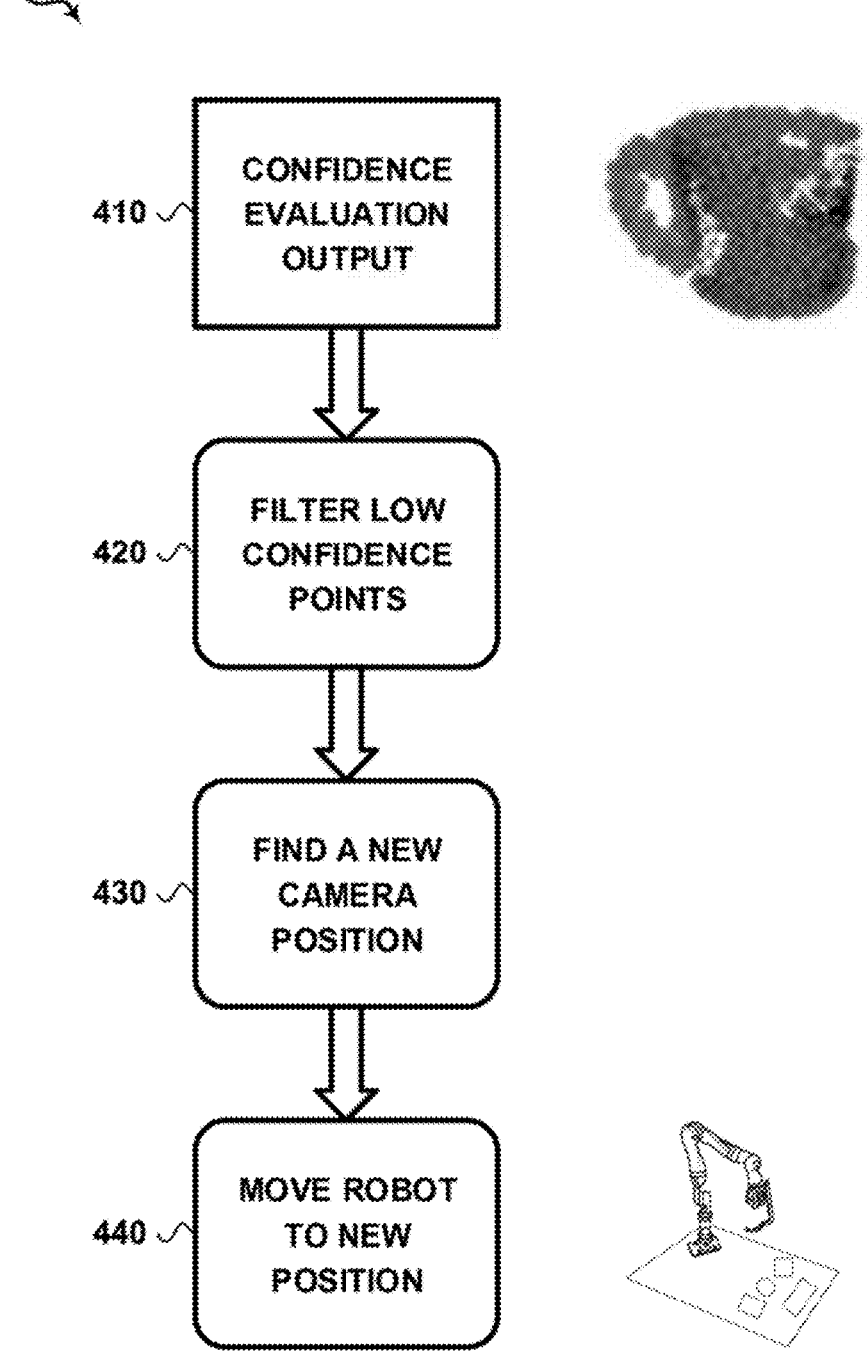
FIG. 4 illustrates an example of a view planning process, in accordance with various aspects of the present disclosure.

FIG. 4 illustrates an example of a view planning process, in accordance with various aspects of the present disclosure.

Referring to FIG. 4, an example of a view planning process 400 that implements one or more aspects of the present disclosure is illustrated. In some embodiments, at least a portion of the operations and/or functions for the view planning process 400 may be performed by the device 100 of FIG. 1 and/or the robot 310 of FIG. 3, which may include the shape prediction evaluation component 180. Alternatively or additionally, another computing device (e.g., a robotic device, a robot controller, a server, a laptop, a smartphone, a UE, a wearable device, a smart device, an IoT device, and the like) that includes the shape prediction evaluation component 180 may perform at least a portion of the operations and/or functions for the view planning process 400.

As shown in FIG. 4, the view planning process 400 may include filtering completed shape pointclouds of partially-observed objects of a scene representation based on the confidence scores 410, in operation 420. For example, the filtering may include filtering out, from the completed shape pointclouds, points having a corresponding confidence score that fails to meet a threshold confidence score, resulting in filtered points of the completed shape pointclouds.

In operation 430, the view planning process 400 may include finding a new camera position based on the filtered points of the completed shape pointclouds. For example, the view planning process 400 may include determining, based on the filtered points of the completed shape pointclouds, a new camera location from which to obtain at least one other image of the scene representation that includes at least one partially-observed portion of the partially-observed objects of the scene representation. As another example, operation 430 may include identifying a region of a target object having a number of data points in the completed shape pointclouds with corresponding confidence scores lower than a predetermined threshold, and determining a new camera location from which to capture at least one other image of the region. In an optional or additional embodiment, operation 430 may include finding a new robotic arm position (e.g., when the image sensor 320 is provided in the robotic arm of robot 310) based on geometry information of the robotic arm and inverse kinematic information.

In an embodiment, the view planning process 400 may include adjusting the threshold confidence score based on updated confidence scores of the at least one other image.

The view planning process 400 may include, in operation 440, controlling the robot 310 to move the robot 310 (or a robotic arm of the robot 310 or an end-effector of the robot 310) to the new camera location when the image sensor 320 is provided on the robot 310. Alternatively or additionally, operation 440 may include causing the image sensor 320 to move to the new camera location when the image sensor 320 is provided separately from the robot 310. In an embodiment, the robot 310 may capture at least one other image of the scene from the new camera location. Consequently, the robot 310 may increase an understanding of the scene (e.g., higher confidence scores) based on the at least one other image captured at the new camera location. In an optional or additional embodiment, the robot 310 may perform an action (e.g., grasping, pushing, pulling, and the like) on at least one target object at the new camera location.

In one or more aspects of the present disclosure, the device 100 of FIG. 1 and/or the robot 310 of FIG. 3 may perform the view planning process 400 one or more times to obtain a semantic and geometric understanding of its surroundings with which it can perform tasks and/or actions in a complex environment, even in the presence of occlusions and/or visual obstructions. For example, assuming a target application consisting of a camera mounted on the wrist of a home assistance robot, the robot may move its arm to observe a given environment. While the robot is moving, the robot may build a map that provides semantic information of observed objects, shape completion predictions of the objects, and the uncertainty of the predictions, using embodiments described above. The robot may use such complete information of the scene to make improved planning decisions, when compared to related mapping approaches.

Having described a process flow for evaluating a reliability of 3D shape predictions and possible use cases in general terms, a number of embodiments are now discussed in further detail with reference to FIGS. 5 to 7.

Figure 5:
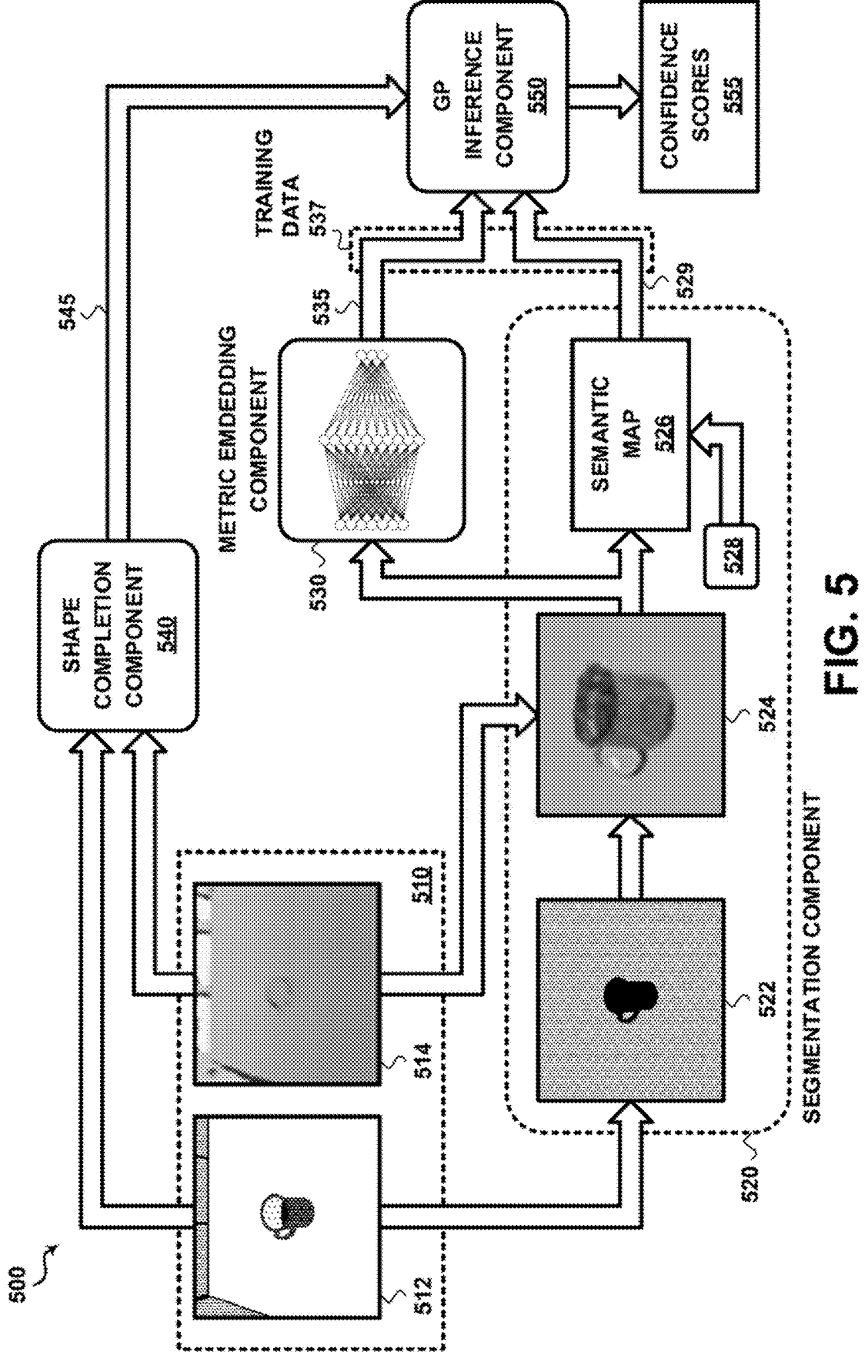
FIG. 5 depicts an example of a data pipeline for evaluating a reliability of 3D shape predictions, in accordance with various aspects of the present disclosure.

FIG. 5 depicts an example of a data pipeline for evaluating a reliability of 3D shape predictions, in accordance with various aspects of the present disclosure.

Referring to FIG. 5, a data pipeline 500 for evaluating a reliability of 3D shape predictions that implements one or more aspects of the present disclosure is illustrated. In some embodiments, at least a portion of the operations and/or functions depicted by the data pipeline 500 may be performed by at least one of the device 100 of FIG. 1 and the robot 310 of FIG. 3, which may include the shape prediction evaluation component 180. Alternatively or additionally, another computing device (e.g., a robotic device, a robot controller, a server, a laptop, a smartphone, a UE, a wearable device, a smart device, an IoT device, and the like) that includes the shape prediction evaluation component 180 may perform at least a portion of the data pipeline 500.

In some embodiments, the data pipeline 500 depicted in FIG. 5 may be used to implement at least a portion of at least one of the shape prediction evaluation process 200, the robot control system 300, and the view planning process 400 described with reference to FIGS. 2 to 4, and may include additional features not mentioned above.

As shown in FIG. 5, the data pipeline 500 may include a segmentation component 520, a metric embedding component 530, a shape completion component 540, and a Gaussian Process (GP) inference component 550.

In an embodiment, the data pipeline 500 may take as input one or more images 510 representing a scene. The one or more images 510 may include image data 512 (e.g., RGB images) and depth data 514 corresponding to the image data 512. For example, the one or more images 510 may include 2D RGB images that may be associated with and/or include depth data 514. In an embodiment, the one or more images 510 may be captured by the input component 150 of the device 100 of FIG. 1. For example, in such an embodiment, the input component 150 may include at least one of a camera, a video camera, a depth camera, a TOF camera, a stereoscopic camera, and the like, capable of capturing and/or providing the one or more images of the scene representation. That is, the present disclosure is not limited in this regard, and aspects presented herein may be applied with other types of image sensors. Notably, the aspects presented herein may be employed with any image sensor capable of providing image data and geometric information associated with the image data.

The segmentation component 520 may be configured to extract geometric information from the image data 512 and the depth data 514 of the one or more images 510. In an embodiment, the geometric information may include 3D shape geometry information of objects observed in the scene representation. Alternatively or additionally, at least one object of the objects observed in the scene representation may be referred to as a partially-observed object. As used herein, a partially-observed object may refer to an object included in the scene representation that may not be fully visible to the image sensor. For example, the partially-observed object may refer to an object in which at least a portion of the object is occluded by the presence of one or more visual obstructions that may prevent the image sensor from capturing the entirety of the object. Alternatively or additionally, the partially-observed object may refer to an object in which at least a portion of the object is obstructed (e.g., unseen) by the object itself. That is, the image sensor may be unable to capture a back (or far) side of the partially-observed object that may be obscured and/or obstructed by a front (or near) side of the object (e.g., when the object is opaque).

The partially-observed objects of the scene representation may include a target object. As used herein, the target object may refer to an object included in the scene that may be an intended target of the robot on which an action (e.g., grasping, pushing, pulling, and the like) may need to be performed.

In an embodiment, the segmentation component 520 may estimate semantic information of partially-observed objects in the scene represented by the one or more images 510, based on the geometric information extracted from the one or more images 510. For example, the segmentation component 520 may estimate the semantic information for each pixel of the one or more images 510, using the geometric information. That is, the segmentation component 520 may estimate semantic information 522 for the objects (e.g., objects 330 of FIG. 3) included in the one or more images 510.

In an embodiment, the one or more images 510 (e.g., image data 512) may be provided to a segmentation network (or model) that may be configured to provide spatial information for each object (e.g., bounding boxes) and/or a segmentation class label for each object, along with a corresponding confidence score of the predicted segmentation class. That is, the segmentation network and/or model may determine an estimation confidence score of the semantic information 522 for each pixel of the one or more images 510, in addition to the semantic information 522. In an optional or additional embodiment, the segmentation network (or model) may be and/or may include a mask region-based convolutional neural network (Mask R-CNN). However, the present disclosure is not limited in this regard, and other networks and/or models may be used without departing from the scope of the present disclosure. Notably, the aspects presented herein may be employed with any segmentation network and/or model capable of providing segmentation information from image data.

The segmentation component 520 may be configured to combine the semantic information 522 with the depth data 514 to obtain segmented pointclouds 524 of the objects 330 in the scene represented by the one or more images 510. That is, the segmentation component 520 may determine the segmented pointclouds 524 of the partially-observed objects in the scene representation by combining the semantic information 522 and the geometric information, such as, but not limited to, the depth data 514. In an embodiment, the segmentation component 520 may generate pointclouds from the image data 512 and the corresponding depth data 514. In such embodiment, the obtaining of the segmented pointclouds 524 may include combining the pointclouds with the semantic information 522 of each pixel in the one or more images 510 and the confidence scores of the predicted segmentation classes.

As shown in FIG. 5, the segmentation component 520 may include a semantic map 526. For example, the segmentation component 520 may be configured to maintain the semantic map 526 of the segmented pointclouds 524 including the semantic information 522 of the partially-observed objects of the scene representation. The semantic map 526 may be configured to maintain a semantic class assigned to each of the partially-observed objects. Alternatively or additionally, the semantic map 526 may be configured to maintain relevant semantic information such as object category, instance identification (ID), and a confidence score for each voxel belonging to an observed object (e.g., any one of objects 330 including the partially-observed objects), as shown in Table 1.

TABLE 1

| Attributes stored in each voxel of a semantic map. | |
| --- | --- |
| No. | Attribute |
| 1 | Position (e.g., x, y, z coordinates) |
| 2 | Color (e.g., red (R), blue (B), green (G)) |
| 3 | Semantic Class (mode of the histogram) |
| 4 | Confidence Score |
| 5 | Object ID |

In an embodiment, the semantic map 526 may be implemented using the OctoMap library that may use an Octree data structure. However, the present disclosure is not limited in this regard. That is, the semantic map 526 may be implemented using other data structures and/or libraries.

In an optional or additional embodiment, the segmentation component 520 may include a tracker 528 that may aid in retrieval of semantic information. For example, the segmentation component 520 may use the tracker 528 to track the partially-observed objects between a first image of the one or more images 510 and a second image of the one or more images 510, using the semantic information 522. That is, the tracker 528 may be configured to maintain consistent object IDs over observed objects unless the objects are heavily cluttered. For example, the tracker 528 may help recover the objects' semantic information if there are significant camera view changes between the one or more images 510. As another example, the tracker 528 may assist in recovery of semantic information when a motion of a robot (e.g., robot 310) and/or the image sensor (e.g., image sensor 320) causes no overlapping observations to exist between two sequential views of the one or more images 510. Related image-based object trackers may rely on overlapping information between different views, and as such, may lose tracking information if the views do not share any visual cues. Thus, according to aspects of the present disclosure, the tracker 528 may be and/or may include a 3D geometry-based tracker that may be able to overcome such limitations.

In an embodiment, the tracker 528 of the segmentation component 520 may calculate a corresponding centroid for the pointclouds of the objects 330 observed in a scene. The tracker 528 may be configured to determine Euclidean distances between the new centroids and existing centroids (e.g., attribute no. 1 of Table 1) to update the set of centroids (e.g., delete, append, modify the centroids). Alternatively or additionally, the tracker 528 may assign an object ID to each centroid in the set of centroids and store the information in the semantic map 526 along with the semantic information 522 in each voxel of the segmented pointclouds 524.

In an optional or additional embodiment, the tracker 528 may maintain a histogram for each semantic class in the voxel map in order to address temporary false predictions that may be caused by a misclassification and/or noise from the image sensor 320. For example, unsteadiness in the segmentation predictions may result in conflicting semantic information for each voxel when the semantic information is aggregated from different views. In order to resolve these conflicts, the tracker 528 may maintain the histogram for each semantic class at the voxel level and/or use the mode of the histogram as a semantic class for the voxel. As a result, the semantic mapping may be resilient to temporary false predictions from the segmentation model and/or noise from the image sensor 320.

Continuing to refer to FIG. 5, the segmented pointclouds 524 of the partially-observed objects in the scene representation determined by the segmentation component 520 may be provided to the metric embedding component 530. The metric embedding component 530 may be configured to create metric embeddings 535 of the segmented pointclouds 524 corresponding to the partially-observed objects of the scene representation.

For example, the metric embedding component 530 may provide, to a transformer model, the segmented pointclouds 524, to obtain embeddings of the segmented pointclouds 524. In an embodiment, the embeddings of the segmented pointclouds 524 may include the semantic information 522 and the geometric information of the segmented pointclouds 524. In an optional or additional embodiment, the metric embedding component 530 may provide, to a perceptron model, the embeddings of the segmented pointclouds 524 to obtain metric embeddings 535 of the segmented pointclouds 524 that may have been forced into a unit-sphere metric space. Alternatively or additionally, the metric embedding component 530 may assign a zero embedding to free space in the metric embeddings 535 of the segmented pointclouds 524. The metric embedding component 530 is further described with reference to FIG. 6.

As shown in FIG. 5, the data pipeline 500 may provide the image data 512 and/or the depth data 514 of the one or more images 510 to a shape completion component 540. The shape completion component 540 may be configured to predict completed shape pointclouds of the partially observed objects of the scene represented by the one or more images 510.

As used herein, shape completion may refer to predicting a shape of an object when only partial observations of the object may be available. Related shape completion approaches may focus on predicting an object's shape based on an object frame. However, such object frame-based shape completion approaches may need additional pose information of the object. That is, multiple poses (e.g., from different positions and/or orientations) of an object may need to be captured in order to obtain sufficient pose information for predicting the object's complete shape. According to aspects of the present disclosure, the shape completion component 540 may provide the one or more images 510 that include the image data 512 and the depth data 514 to a shape completion model that may be able to overcome such limitations, and may be able to predict completed shape pointclouds 545 from a single view (or pose).

In an embodiment, the shape completion model may be and/or may include a CenterSnap model that may complete an object's shape in a world frame. However, the present disclosure is not limited in this regard, and other networks and/or models may be used without departing from the scope of the present disclosure. Notably, the aspects presented herein may be employed with any shape completion network and/or model capable of providing completed shape pointclouds from image and/or depth data containing a single view.

The shape completion model may receive as input the image data 512 and the depth data 514. The shape completion model may have been trained using a publicly available dataset such as, but not limited to, a Normalized Object Coordinate Space (NOCS) dataset. However, the present disclosure is not limited in this regard, and the shape completion model may be trained using other datasets that contain multiple object classes (e.g., six (6)). The shape completion model may be configured to output 3D shape reconstructions (e.g., pointclouds) of the objects (e.g., objects 330) in the scene represented by the one or more images 510. The shape completion model may be further configured to output categorical six (6) degree-of-freedom (6DOF) poses (e.g., 3D orientation and position) and/or size estimates of the objects in the scene. For example, the shape completion model may output shape completed pointclouds and bounding boxes in the camera frame. That is, the shape reconstructions may be mapped to a coordinate system of the image sensor 320 that may have been used to obtain the one or more images 510.

In an embodiment, the shape completion component 540 may be configured to transform the shape reconstructions from the coordinate system of the image sensor 320 to a world coordinate system, based on physical configuration information of the image sensor 320. For example, the physical configuration information of the image sensor 320 may include position information of the image sensor relative to the world coordinate system (e.g., a base of a robotic arm of the robot 310). While the completed shape pointclouds 545 provided by the shape completion component 540 may be used to predict unobserved parts of objects in the scene, the completed shape pointclouds 545 may not provide for evaluating the reliability (e.g., confidence) of each predicted point in the completed shape pointclouds 545. To that end, the shape completion component 540 may provide, to a Gaussian Process (GP) inference component 550, the completed shape pointclouds 545 which have been transformed into the world coordinate system.

The Gaussian process (GP) inference component 550 may be configured to generate, using a probabilistic machine learning model such as GP model, confidence scores 555 for each point of the completed shape pointclouds 545, based on a correlation between the geometric information and the semantic information 522 extracted from the one or more images 510. The GP model may define or use a distribution over functions that explain observed data, where the distribution may be characterized by a mean function and a covariance function of the distribution. In an embodiment, the GP model may have been conditioned (trained) using training data 537 that may include the 3D metric embeddings 535 of the segmented pointclouds 524 created by the metric embedding component 530 and the semantic information 529 contained in the semantic map 526 (e.g., semantic class label, confidence score, and object ID for each voxel). That is, the GP model may be trained in a high-dimensional embedding space and conditioned on the partial pointclouds of objects in the scene and their semantic information. Consequently, the GP model may be generalizable to input modalities and/or may not be bound by object semantic classes or the complexity of object geometries, unlike other related robotic mapping approaches. As a result, the GP model may provide improved confidence scores of the completed shape pointclouds, when compared to the related robotic mapping approaches. While the Gaussian process (GP) inference component 550 using a GP model is described as an example, various embodiments of the present disclosure are not limited thereto, and another probabilistic machine learning model such as a Bayesian neural network model may be used instead of the GP model. The GP inference component 550 is further described with reference to FIG. 7.

Figure 6:
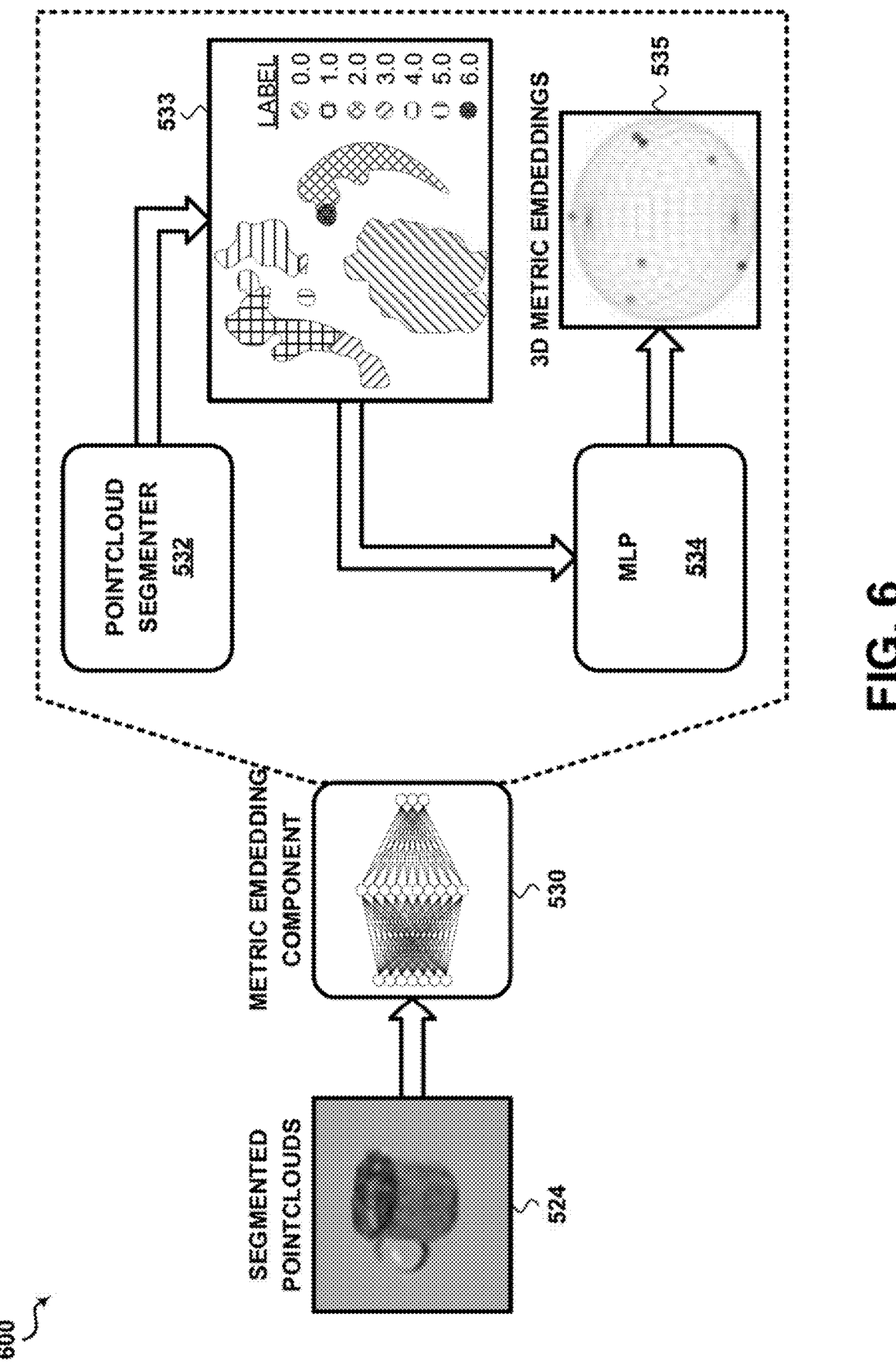
FIG. 6 illustrates an example of a metric embedding component, in accordance with various aspects of the present disclosure.

FIG. 6 illustrates an example of a metric embedding component, in accordance with various aspects of the present disclosure.

Referring to FIG. 6, diagram 600 illustrates an example of the metric embedding component 530 of FIG. 5 that implements one or more aspects of the present disclosure. In some embodiments, at least a portion of the operations and/or functions described as being performed by the metric embedding component 530 may be performed by the device 100 of FIG. 1 or the robot 310 of FIG. 3, which may include the shape prediction evaluation component 180. Alternatively or additionally, another computing device (e.g., a robotic device, a robot controller, a server, a laptop, a smartphone, a UE, a wearable device, a smart device, an IoT device, and the like) that includes the shape prediction evaluation component 180 may perform at least a portion of operations and/or functions of the metric embedding component 530.

In some embodiments, the metric embedding component 530 depicted in FIG. 6 may be used to implement at least a portion of at least one of the shape prediction evaluation process 200, the robot control system 300, the view planning process 400, and the data pipeline 500 described with reference to FIGS. 2 to 5, and may include additional features not mentioned above.

As shown in FIG. 6, the metric embedding component 530 may be provided as input the segmented pointclouds 524 of the partially-observed objects in the one or more images 510 representing a scene. As described with reference to FIG. 5, the segmented pointclouds 524 may have been obtained by combining semantic information 522 and geometric information, such as, but not limited to, depth data 514.

The metric embedding component 530 may provide the segmented pointclouds 524 to a transformer model 532 to obtain initial embeddings 533 of the segmented pointclouds 524. In an embodiment, the transformer model 532 may be and/or may include a pointcloud segmenter model such as, but not limited to, a dynamic graph convolutional neural network (DGCNN). However, the present disclosure is not limited in this regard, and other networks and/or models may be used without departing from the scope of the present disclosure. Notably, the aspects presented herein may be employed with any pointcloud segmentation network and/or model capable of providing embeddings from segmented pointclouds.

In an embodiment, the metric embedding component 530 may be configured to provide the segmented pointclouds 524 to the transformer model 532 (e.g., DGCNN) and obtain the seven (7) dimensional (7D) initial embeddings 533 from the last dense layer of the transformer model 532. As used herein, embeddings may refer to intermediate results obtained from a neural network before predictions are made at the last layer of the network. In an embodiment, the intermediate results may be referred to as embeddings because the results embed information, such as, but not limited to, semantic information and geometric information.

The metric embedding component 530 may provide the initial embeddings 533 to a perceptron model 534 to obtain the 3D metric embeddings 535 of the segmented pointclouds 524. The perceptron model 534 may be configured to enforce embeddings to a unit-sphere metric space. In an embodiment, the perceptron model 534 may be and/or may include a multi-layer perceptron (MLP) model. However, the present disclosure is not limited in this regard, and other networks and/or models may be used without departing from the scope of the present disclosure. Notably, the aspects presented herein may be employed with any network and/or model capable of enforcing embeddings to a unit-sphere metric space.

In an embodiment, the perceptron model 534 may consist of four dense layers (e.g., (7×250), (250×100), (100×50), and (50×3)). Alternatively or additionally, the perceptron model 534 may been trained with an angular softmax (A-Softmax) loss that may force the perceptron model 534 to generate embeddings on the unit-sphere surface. As a result, metric embedding component 530 may yield 3D metric embeddings 535 for the segmented pointclouds 524. In an optional or additional embodiment, free space may not have any geometry, thus, its embedding may not be learned. Consequently, the perceptron model 534 may assign a zero embedding to free space explicitly. Alternatively or additionally, in order to make object embeddings equidistant from the free space embedding, the perceptron model 534 may constrain the object embeddings to lie on a surface of a unit-sphere.

As described above with reference to FIG. 5, the 3D metric embeddings 535 and the semantic information 529 may be used to train the GP inference component 550 prior to the GP inference component 550 being used to generate the confidence scores 555 for each point of the completed shape pointclouds 545 generated by the shape completion component 540.

Figure 7:
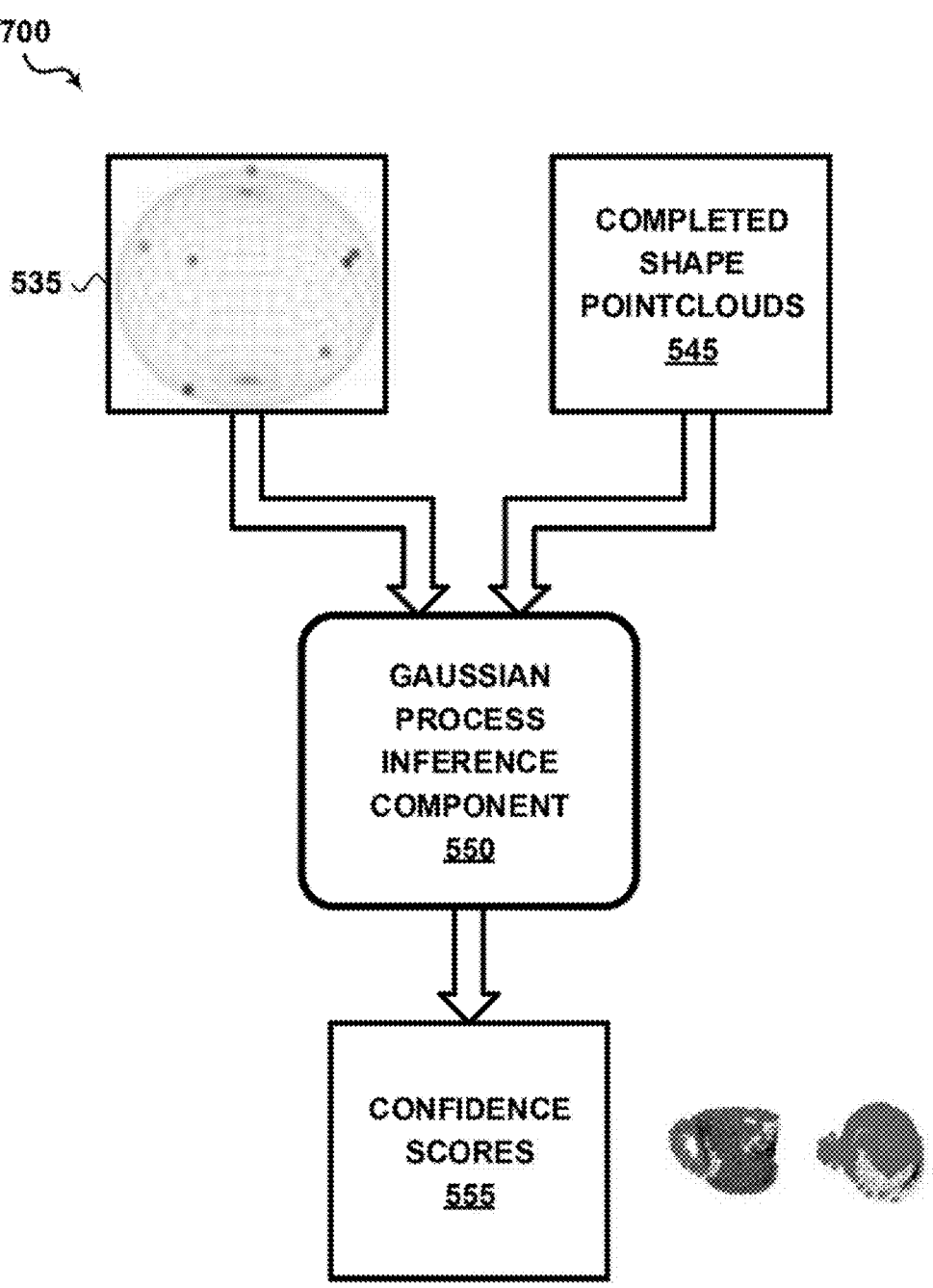
FIG. 7 depicts an example of a Gaussian process (GP) inference component, in accordance with various aspects of the present disclosure.

FIG. 7 depicts an example of a GP inference component, in accordance with various aspects of the present disclosure.

Referring to FIG. 7, diagram 700 depicts an example of the GP inference component 550 of FIG. 5 that implements one or more aspects of the present disclosure. In some embodiments, at least a portion of the operations and/or functions described as being performed by the GP inference component 550 may be performed by the device 100 of FIG. 1 or the robot 310 of FIG. 3, which may include the shape prediction evaluation component 180. Alternatively or additionally, another computing device (e.g., a robotic device, a robot controller, a server, a laptop, a smartphone, a UE, a wearable device, a smart device, an IoT device, and the like) that includes the shape prediction evaluation component 180 may perform at least a portion of operations and/or functions of the GP inference component 550.

In some embodiments, the GP inference component 550 depicted in FIG. 7 may be used to implement at least a portion of at least one of the shape prediction evaluation process 200, the robot control system 300, the view planning process 400, and the data pipeline 500 described with reference to FIGS. 2 to 5, and may include additional features not mentioned above.

The GP inference component 550 may be and/or may include a GP model. The GP model may be able to capture an underlying structure from training data points (e.g., the 3D metric embeddings 535 of segmented pointclouds 524 and the semantic information 529) and use the captured structure to make predictions for test data points (e.g., the completed shape pointclouds 545). However, a computational cost of performing these predictions may be excessive, in particular when the size of the data is relatively large (e.g., exceeds a particular threshold). To potentially address these limitations, a GP acceleration library may be used to allow a processor (e.g., a GPU) to run GP inference at a relatively high speed. For example, the GP acceleration library may be and/or may include GPytorch, which is an open source library that uses Pytorch and Compute Unified Device Architecture (CUDA) to enable a GPU to run relatively fast GP inferences. However, the present disclosure is not limited in this regard, and other GP acceleration libraries may be used without departing from the scope of the present disclosure.

In an embodiment, the GP model may be and/or may include a Dirichlet GP classification model that may solve a classification problem by transforming class labels with a Dirichlet distribution. However, the present disclosure is not limited in this regard, and other networks and/or models may be used without departing from the scope of the present disclosure. Notably, the aspects presented herein may be employed with any GP-based network and/or model capable of generating confidence scores of completed shape pointclouds and being conditioned on metric embeddings of segmented pointclouds and semantic information.

The GP model may be constructed using training points obtained in a learning metric embedding space, such as the 3D metric embeddings 535 created by the metric embedding component 530. In an embodiment, the 3D metric embeddings 535 may be appended to relevant points resulting in 6-dimensional (6D) training data (e.g., x, y, z, $e_1$, $e_2$, and $e_3$). Alternatively or additionally, the covariance matrix K for the GP model may be represented as an equation similar to Eq. 1.

$$K = \begin{pmatrix} K(X, X) & K(X, X_*)_*^T \\ K(X, X_*) & K(X_*, X_*) \end{pmatrix} \qquad \text{[Eq. 1]}$$

Referring to Eq. 1, X may represent the training data points and $X_*$ may represent the test data points. For example, during a training phase of the GP model, the K(X, X) matrix may be constructed using the 3D metric embeddings 535 (e.g., $e_1$, $e_2$, and $e_3$) of the training points. Alternatively or additionally, during an inference phase of the GP model, the K(X, $X_*$) matrix may be calculated using 3D coordinates (e.g., x, y, and z) of both training and test points.

In an embodiment, at least some of the test points may be unobserved (e.g., occluded and/or obstructed), and as such, prior information (e.g., colors, cluster shapes, and the like) of the test points may not be available and/or known, except for their predicted geometric coordinates. Consequently, the 3D coordinates of the training points may be used to find a correlation between the training test points and the test points via the K(X, $X_*$) matrix. In a similar manner, the K($X_*$, $X_*$) matrix may be calculated using 3D coordinates (e.g., x, y, and z) of the test points.

The GP model, during the inference phase, may provide a variance σ along with the predictions. In an embodiment, the GP inference component 550 may be configured to compute a raw confidence score s of each prediction by measuring the variance reduction. The raw confidence score s may be represented as an equation similar to Eq. 2.

$$s = \frac{1 - \sigma}{1 - \sigma_{min}} \qquad \text{[Eq. 2]}$$

Alternatively or additionally, the GP inference component 550 may normalize the raw confidence score s to obtain a normalized score s̃ ranging between zero (0) and one (1). The normalized score s̃ may be computed using an equation similar to Eq. 3.

$$\tilde{s} = \frac{s - s_{min}}{s_{max} - s_{min}} \qquad \text{[Eq. 3]}$$

In an embodiment, the GP inference component 550 may compute the final prediction confidence scores 555 for the shape completed pointclouds and their associated semantic information by multiplying the normalized score s̃ by the confidence score given by the segmentation network of the segmentation component 520. For example, the GP inference component 550 may obtain the segmentation confidence score from the semantic information 529 provided to the GP inference component 550.

Advantageously, the apparatuses and processes for evaluating a reliability of 3D shape predictions, described above with reference to FIGS. 1 to 7, may provide for a probabilistic approach to robotic mapping that unifies semantic information and shape completion predictions obtained from partial view images and calculates confidence scores of the shape completion predictions. That is, aspects presented herein provide for transferring sensor measurements to a learned metric space for training a GP model. Alternatively or additionally, the trained GP model may be used to measure the uncertainty of the unified information and make more accurate predictions when compared with a related GP model that may not use the unified information.

Figure 8:
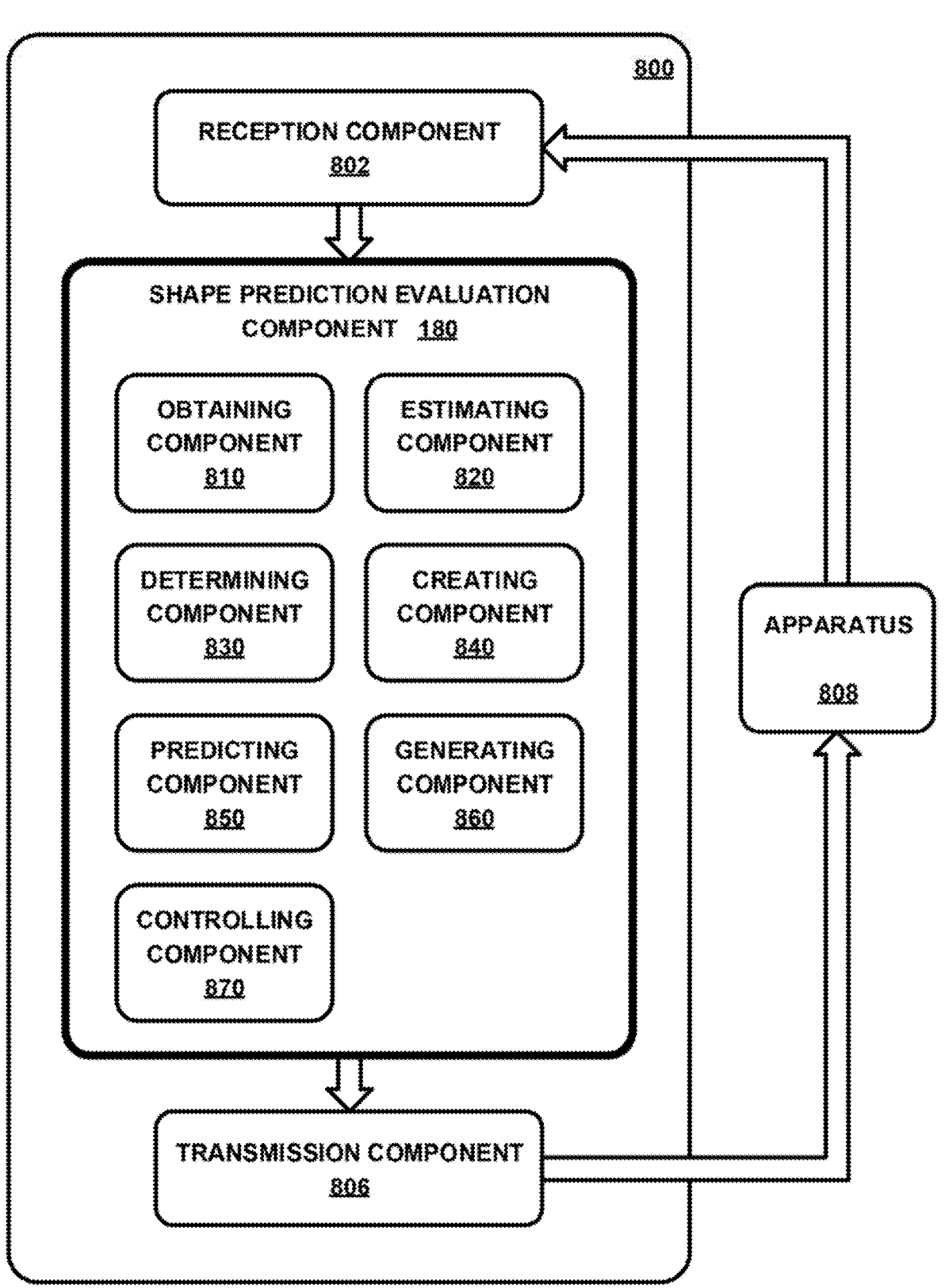
FIG. 8 illustrates a block diagram of an example apparatus for evaluating a reliability of 3D shape predictions, in accordance with various aspects of the present disclosure.

FIG. 8 illustrates a block diagram of an example apparatus for evaluating a reliability of 3D shape predictions and/or controlling robot motion, in accordance with various aspects of the present disclosure. The apparatus 800 may be a computing device (e.g., device 100 of FIG. 1) and/or a computing device may include the apparatus 800. In some embodiments, the apparatus 800 may include a reception component 802 configured to receive communications (e.g., wired, wireless) from another apparatus (e.g., apparatus 808), a shape prediction evaluation component 180 configured to evaluate a reliability of 3D shape predictions, and a transmission component 806 configured to transmit communications (e.g., wired, wireless) to another apparatus (e.g., apparatus 808). The components of the apparatus 800 may be in communication with one another (e.g., via one or more buses or electrical connections). As shown in FIG. 8, the apparatus 800 may be in communication with another apparatus 808 (such as, but not limited to, a robotic device, a robot controller, a server, a laptop, a smartphone, a UE, a wearable device, a smart device, an IoT device, and the like) using the reception component 802 and/or the transmission component 806.

In some embodiments, the apparatus 800 may be configured to perform one or more operations described herein in connection with FIGS. 1 to 7. Alternatively or additionally, the apparatus 800 may be configured to perform one or more processes described herein, such as method 900 of FIG. 9 and/or method 1000 of FIG. 10. In some embodiments, the apparatus 800 may include one or more components of the device 100 described with reference to FIG. 1.

The reception component 802 may receive communications, such as control information, data communications, or a combination thereof, from the apparatus 808 (e.g., a robotic device, a robot controller, a server, a laptop, a smartphone, a UE, a wearable device, a smart device, an IoT device, and the like). The reception component 802 may provide received communications to one or more other components of the apparatus 800, such as the shape prediction evaluation component 180. In some embodiments, the reception component 802 may perform signal processing on the received communications, and may provide the processed signals to the one or more other components. In some embodiments, the reception component 802 may include one or more antennas, a receive processor, a controller/processor, a memory, or a combination thereof, of the device 100 described with reference to FIG. 1.

The transmission component 806 may transmit communications, such as control information, data communications, or a combination thereof, to the apparatus 808 (e.g., a robotic device, a robot controller, a server, a laptop, a smartphone, a UE, a wearable device, a smart device, an IoT device, and the like). In some embodiments, the shape prediction evaluation component 180 may generate communications and may transmit the generated communications to the transmission component 806 for transmission to the apparatus 808. In some embodiments, the transmission component 806 may perform signal processing on the generated communications, and may transmit the processed signals to the apparatus 808. In other embodiments, the transmission component 806 may include one or more antennas, a transmit processor, a controller/processor, a memory, or a combination thereof, of the device 100 described with reference to FIG. 1. In some embodiments, the transmission component 806 may be co-located with the reception component 802 such as in a transceiver and/or a transceiver component.

The shape prediction evaluation component 180 may be configured to evaluate a reliability of 3D shape predictions. In some embodiments, the shape prediction evaluation component 180 may include a set of components, such as an obtaining component 810 configured to obtain a scene representation, an estimating component 820 configured to estimate semantic information of partially-observed objects, a determining component 830 configured to determine segmented pointclouds of the partially-observed objects, a creating component 840 configured to create metric embeddings of the segmented pointclouds, a predicting component 850 configured to predict completed shape pointclouds of the partially-observed objects, a generating component 860 configured to generate confidence scores of the completed shape pointclouds, and a controlling component 870 configured to control a motion of a robot.

In some embodiments, the set of components may be separate and distinct from the shape prediction evaluation component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIGS. 1 to 7.

Referring to FIG. 9, in operation, an apparatus 800 may perform a method 900 of controlling robot motion. The method 900 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the shape prediction evaluation component 180), the robot 310, and/or the apparatus 800. The method 900 may be performed by the device 100, the robot 310, the apparatus 800, and/or the shape prediction evaluation component 180 in communication with the apparatus 808 (e.g., a robotic device, a robot controller, a server, a laptop, a smartphone, a UE, a wearable device, a smart device, an IoT device, and the like).

At block 910 of FIG. 9, the method 900 may include obtaining a scene representation comprising one or more images, each image of the one or more images comprising depth information. For example, in an aspect, the device 100, the robot 310, the shape prediction evaluation component 180, and/or the obtaining component 810 may be configured to or may include means for obtaining a scene representation comprising one or more images 510, each image of the one or more images comprising depth information 514.

For example, the obtaining at block 910 may include obtaining the one or more images 510 from a first camera location. In such an embodiment, the obtaining at block 910 may further include filtering out, from the completed shape pointclouds 545, points having a corresponding confidence score 555 that fails to meet a threshold confidence score, resulting in filtered points of the completed shape pointclouds 545. The obtaining at block 910 may further include determining, based on the filtered points of the completed shape pointclouds 545, a second camera location, different from the first camera location, from which to obtain at least one other image of the scene representation that includes at least one partially-observed portion of the partially-observed objects of the scene representation.

In an embodiment, the obtaining at block 910 may include adjusting the threshold confidence score based on updated confidence scores of the at least one other image.

At block 920 of FIG. 9, the method 900 may include estimating semantic information of partially-observed objects in the scene representation, based on geometric information extracted from the one or more images. For example, in an aspect, the device 100, the robot 310, the shape prediction evaluation component 180, and/or the estimating component 820 may be configured to or may include means for estimating semantic information 522 of partially-observed objects in the scene representation, based on geometric information extracted from the one or more images 510.

For example, the estimating at block 920 may include providing the one or more images 510 (e.g., image data 512) to a segmentation network (or model) that may be configured to provide spatial information for each object (e.g., bounding boxes) and/or a segmentation class label for each object, along with a corresponding confidence score of the predicted segmentation class, as described with reference to FIG. 5.

At block 930 of FIG. 9, the method 900 may include determining segmented pointclouds of the partially-observed objects in the scene representation based on the semantic information and the geometric information. For example, in an aspect, the device 100, the robot 310, the shape prediction evaluation component 180, and/or the determining component 830 may be configured to or may include means for determining segmented pointclouds 524 of the partially-observed objects in the scene representation based on the semantic information 522 and the geometric information.

For example, the determining at block 930 may include extracting the geometric information from image data 512 and the depth information 514 of the one or more images 510.

In an optional or additional embodiment, the determining at block 930 may include estimating the semantic information 522 for each pixel of the one or more images 510, using the geometric information.

In another optional or additional embodiment, the determining at block 930 may include determining an estimation confidence score of the semantic information 522 for each pixel of the one or more images 510.

In another optional or additional embodiment, the determining at block 930 may include combining the semantic information 522 with the depth information 514, resulting in the segmented pointclouds 524.

In another optional or additional embodiment, the determining at block 930 may include maintaining a semantic map 526 of the segmented pointclouds 524 including the semantic information 522 of the partially-observed objects of the scene representation. The semantic information may include a semantic class assigned to each of the partially-observed objects.

In another optional or additional embodiment, the determining at block 930 may include tracking, with a tracker 528, the partially-observed objects between a first image of the one or more images 510 and a second image of the one or more images 510, using the semantic information 522.

At block 940 of FIG. 9, the method 900 may include creating metric embeddings of the segmented pointclouds corresponding to the partially-observed objects of the scene representation. For example, in an aspect, the device 100, the robot 310, the shape prediction evaluation component 180, and/or the creating component 840 may be configured to or may include means for creating metric embeddings 535 of the segmented pointclouds 524 corresponding to the partially-observed objects of the scene representation.

For example, the creating at block 940 may include providing, to a transformer model, the segmented pointclouds, to obtain embeddings of the segmented pointclouds. The embeddings of the segmented pointclouds may include the semantic information and the geometric information of the segmented pointclouds.

In an embodiment, the creating at block 940 may include providing, to a perceptron model, the embeddings of the segmented pointclouds to obtain the metric embeddings of the segmented pointclouds. The metric embeddings of the segmented pointclouds having been forced into a unit-sphere metric space.

In an optional or additional embodiment, the creating at block 940 may include assigning a zero embedding to free space in the metric embeddings of the segmented pointclouds.

At block 950 of FIG. 9, the method 900 may include predicting completed shape pointclouds of the partially-observed objects of the scene representation. For example, in an aspect, the device 100, the robot 310, the shape prediction evaluation component 180, and/or the predicting component 850 may be configured to or may include means for predicting completed shape pointclouds 545 of the partially-observed objects of the scene representation.

For example, the predicting at block 950 may include providing, to a shape completion model, the one or more images comprising image data and the depth information.

In an embodiment, the predicting at block 950 may include obtaining, from the shape completion model, shape reconstructions of the partially-observed objects of the scene representation. The shape reconstructions may be mapped to a coordinate system of an image sensor used to obtain the one or more images.

In an optional or additional embodiment, the predicting at block 950 may include transforming the shape reconstructions from the coordinate system of the image sensor to a world coordinate system, based on physical configuration information of the image sensor.

At block 960 of FIG. 9, the method 900 may include generating, using a probabilistic machine learning model, confidence scores for each point of the completed shape pointclouds, based on a correlation between the geometric information and the semantic information. For example, in an aspect, the device 100, the robot 310, the shape prediction evaluation component 180, and/or the generating component 860 may be configured to or may include means for generating, using a probabilistic machine learning model 550, confidence scores 555 for each point of the completed shape pointclouds 545, based on a correlation between the geometric information and the semantic information 522.

For example, the generating at block 960 may include training the probabilistic machine learning model 550 using training data that includes the metric embeddings 535 of the segmented pointclouds 524.

In an embodiment, the probabilistic machine learning model 550 may be a Gaussian process model, and the partially-observed objects of the scene representation may include a target object. In such an embodiment, the generating at block 960 may include generating the confidence scores 555 based on at least one of object properties which indicates whether the target object is fragile and a past robot experience indicating whether the robot previously handled the target object.

At block 970 of FIG. 9, the method 900 may include controlling a motion of a robot based on the confidence scores for each point of the completed shape pointclouds. For example, in an aspect, the device 100, the robot 310, the shape prediction evaluation component 180, and/or the controlling component 870 may be configured to or may include means for controlling a motion of a robot based on the confidence scores for each point of the completed shape pointclouds.

In an embodiment, the processor 120 may be included in the robot 310, and the partially-observed objects of the scene representation include a target object. In such an embodiment, the controlling at block 970 may include controlling at least one of an arm and an end-effector of the robot 310 to enable the robot 310 to grab the target object.

In an optional or additional embodiment, the processor 120 may be included in an external device that may be provided separately from the robot 310, and the partially-observed objects of the scene representation may include a target object. In such an embodiment, the controlling at block 970 may include transmitting, to the robot 310, motion control parameters of at least one of an arm and an end-effector of the robot 310, causing the robot 310 to grab the target object based on the motion control parameters.

In an optional or additional aspect that may be combined with any other aspects, the partially-observed objects of the scene representation may include a target object. In such an aspect, the method 900 may further include identifying a region of the target object having a number of data points in the completed shape pointclouds with corresponding confidence scores lower than a predetermined threshold, and controlling the robot 310 to capture at least one other image of the region of the target object.

Referring to FIG. 10, in operation, an apparatus 800 may perform a method 1000 of evaluating a reliability of 3D shape predictions. The method 1000 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the shape prediction evaluation component 180), the robot 310, and/or the apparatus 800. The method 1000 may be performed by the device 100, the robot 310, the apparatus 800, and/or the shape prediction evaluation component 180 in communication with the apparatus 808 (e.g., a robotic device, a robot controller, a server, a laptop, a smartphone, a UE, a wearable device, a smart device, an IoT device, and the like).

At block 1010 of FIG. 10, the method 1000 may include creating metric embeddings of segmented pointclouds corresponding to partially-observed objects of a scene representation, based on estimated semantic information of the partially-observed objects and geometric information extracted from the scene representation. For example, in an aspect, the device 100, the robot 310, the shape prediction evaluation component 180, and/or the creating component 840 may be configured to or may include means for creating metric embeddings of segmented pointclouds corresponding to partially-observed objects of a scene representation, based on a combination of estimated semantic information of the partially-observed objects and geometric information extracted from the scene representation.

For example, the creating at block 1010 may include providing, to a transformer model, the segmented pointclouds, to obtain embeddings of the segmented pointclouds. The embeddings of the segmented pointclouds may include the semantic information and the geometric information of the segmented pointclouds.

In an embodiment, the creating at block 1010 may include providing, to a perceptron model, the embeddings of the segmented pointclouds to obtain the metric embeddings of the segmented pointclouds. The metric embeddings of the segmented pointclouds having been forced into a unit-sphere metric space.

In an optional or additional embodiment, the creating at block 1010 may include assigning a zero embedding to free space in the metric embeddings of the segmented pointclouds.

At block 1020 of FIG. 10, the method 1000 may include predicting completed shape pointclouds of the partially-observed objects of the scene representation. For example, in an aspect, the device 100, the robot 310, the shape prediction evaluation component 180, and/or the predicting component 850 may be configured to or may include means for predicting completed shape pointclouds of the partially-observed objects of the scene representation.

For example, the predicting at block 1020 may include providing, to a shape completion model, the one or more images comprising image data and the depth information.

In an embodiment, the predicting at block 1020 may include obtaining, from the shape completion model, shape reconstructions of the partially-observed objects of the scene representation. The shape reconstructions may be mapped to a coordinate system of an image sensor used to obtain the one or more images.

In an optional or additional embodiment, the predicting at block 1020 may include transforming the shape reconstructions from the coordinate system of the image sensor to a world coordinate system, based on physical configuration information of the image sensor.

At block 1030 of FIG. 10, the method 1000 may include generating, using a probabilistic machine learning model, confidence scores for each point of the completed shape pointclouds, based on a correlation between the geometric information and the semantic information. For example, in an aspect, the device 100, the robot 310, the shape prediction evaluation component 180, and/or the generating component 860 may be configured to or may include means for generating, using a probabilistic machine learning model, confidence scores for each point of the completed shape pointclouds, based on a correlation between the geometric information and the semantic information.

For example, the generating at block 1030 may include training the probabilistic machine learning model 550 using training data that includes the metric embeddings 535 of the segmented pointclouds 524.

In an embodiment, the probabilistic machine learning model 550 may be a Gaussian process model, and the partially-observed objects of the scene representation may include a target object. In such an embodiment, the generating at block 1030 may include generating the confidence scores 555 based on at least one of object properties indicating whether the target object is fragile and a past robot experience indicating whether the robot previously handled the target object.

The following aspects are illustrative only and aspects thereof may be combined with aspects of other embodiments or teaching described herein, without limitation.

Aspect 1 is a method of evaluating a reliability of 3D shape predictions, to be performed by a processor. The method includes obtaining a scene representation including one or more images. Each image of the one or more images includes depth information. The method further includes estimating semantic information of partially-observed objects in the scene representation, based on geometric information extracted from the one or more images. The method further includes obtaining segmented pointclouds of the partially-observed objects in the scene representation based on the semantic information and the geometric information. The method further includes creating metric embeddings of the segmented pointclouds corresponding to the partially-observed objects of the scene representation. The method further includes predicting completed shape pointclouds of the partially-observed objects of the scene representation. The method further includes generating, using a probabilistic machine learning model, confidence scores for each point of the completed shape pointclouds, based on a correlation between the geometric information and the semantic information. The probabilistic machine learning model has been trained using training data including the metric embeddings of the segmented pointclouds. The method further includes controlling a motion of a robot based on the confidence scores for each point of the completed shape pointclouds.

In Aspect 2, the processor of Aspect 1 may be included in the robot, and the partially-observed objects of the scene representation may include a target object. In such aspects, the controlling of the motion of the robot may include controlling at least one of an arm and an end-effector of the robot to enable the robot to grab the target object.

In Aspect 3, the processor of Aspect 1 may be included in an external device that may be provided separately from the robot, and the partially-observed objects of the scene representation may include a target object. In such aspects, the controlling of the motion of the robot may include transmitting, to the robot, motion control parameters of at least one of an arm and an end-effector of the robot, that may cause the robot to grab the target object based on the motion control parameters.

In Aspect 4, the probabilistic machine learning model of any of Aspects 1 to 3 may be a Gaussian process model, and the partially-observed objects of the scene representation of any of Aspects 1 to 3 may include a target object. In such aspects, the generating of the confidence scores may include generating the confidence scores based on at least one of object properties which indicates whether the target object is fragile and a past robot experience indicating whether the robot previously handled the target object.

In Aspect 5, the partially-observed objects of the scene representation of any of Aspects 1 to 4 may include a target object. In such aspects, the method may further include identifying a region of the target object that may have a number of data points in the completed shape pointclouds with corresponding confidence scores lower than a predetermined threshold, and controlling the robot to capture at least one other image of the region of the target object.

In Aspect 6, the obtaining of the scene representation of any of Aspects 1 to 5 may include obtaining the one or more images from a first camera location. In such aspects, the method may further include filtering out, from the completed shape pointclouds, points having a corresponding confidence score that may fail to meet a threshold confidence score, resulting in filtered points of the completed shape pointclouds, and determining, based on the filtered points of the completed shape pointclouds, a second camera location, different from the first camera location, from which to obtain at least one other image of the scene representation that may include at least one partially-observed portion of the partially-observed objects of the scene representation.

In Aspect 7, the method of any of Aspects 1 to 6 may further include adjusting the threshold confidence score based on updated confidence scores of the at least one other image.

In Aspect 8, the obtaining of the segmented pointclouds of any of Aspects 1 to 7 may include extracting the geometric information from image data and the depth information of the one or more images, estimating the semantic information for each pixel of the one or more images, using the geometric information, determining an estimation confidence score of the semantic information for each pixel of the one or more images, and combining the semantic information with the depth information, resulting in the segmented pointclouds.

In Aspect 9, the obtaining of the segmented pointclouds of any of Aspects 1 to 8 may include maintaining a semantic map of the segmented pointclouds that may include the semantic information of the partially-observed objects of the scene representation, and tracking the partially-observed objects between a first image of the one or more images and a second image of the one or more images, using the semantic information. The semantic information may include a semantic class assigned to each of the partially-observed objects.

In Aspect 10, the creating of the metric embeddings of the segmented pointclouds of any of Aspects 1 to 9 may include providing, to a transformer model, the segmented pointclouds, to obtain embeddings of the segmented pointclouds, and providing, to a perceptron model, the embeddings of the segmented pointclouds to obtain the metric embeddings of the segmented pointclouds. The embeddings of the segmented pointclouds may include the semantic information and the geometric information of the segmented pointclouds. The metric embeddings of the segmented pointclouds may have been forced into a unit-sphere metric space.

In Aspect 11, the creating of the metric embeddings of the segmented pointclouds of any of Aspects 1 to 10 may further include assigning a zero embedding to free space in the metric embeddings of the segmented pointclouds.

In Aspect 12, the predicting of the completed shape pointclouds of any of Aspects 1 to 11 may include providing, to a shape completion model, the one or more images including image data and the depth information, obtaining, from the shape completion model, shape reconstructions of the partially-observed objects of the scene representation, and transforming the shape reconstructions from the coordinate system of the image sensor to a world coordinate system, based on physical configuration information of the image sensor. The shape reconstructions may be mapped to a coordinate system of an image sensor used to obtain the one or more images.

Aspect 13 is an apparatus for evaluating a reliability of 3D shape predictions. The apparatus includes a memory storing instructions, and a processor communicatively coupled the memory. The processor is configured to execute the instructions to perform one or more of the methods of any of Aspects 1 to 12.

Aspect 14 is an apparatus for evaluating a reliability of 3D shape predictions including means for performing one or more of the methods of any of Aspects 1 to 12.

Aspect 15 is a non-transitory computer-readable storage medium storing computer-executable instructions for evaluating a reliability of 3D shape predictions. The computer-executable instructions are configured, when executed by one or more processors of a device, to cause the device to perform one or more of the methods of any of Aspects 1 to 12.

Aspect 16 is a method of evaluating a reliability of 3D shape predictions, to be performed by a processor. The method includes creating metric embeddings of segmented pointclouds corresponding to partially-observed objects of a scene representation, based on estimated semantic information of the partially-observed objects and geometric information extracted from the scene representation. The method further includes predicting completed shape pointclouds of the partially-observed objects of the scene representation. The method further includes generating, using a probabilistic machine learning model, confidence scores for each point of the completed shape pointclouds, based on a correlation between the geometric information and the semantic information.

In Aspect 17, the method of Aspect 16 may include one or more of the methods of any of Aspects 1 to 12.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1, 3, and 5 to 10) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method for controlling robot motion, the method comprising:

obtaining a scene representation comprising one or more images, each image of the one or more images comprising depth information;

estimating semantic information of partially-observed objects in the scene representation, based on geometric information extracted from the one or more images;

determining segmented pointclouds of the partially-observed objects in the scene representation based on the semantic information and the geometric information;

creating metric embeddings of the segmented pointclouds corresponding to the partially-observed objects of the scene representation;

predicting completed shape pointclouds of the partially-observed objects of the scene representation;

generating, using a probabilistic machine learning model, confidence scores for each point of the completed shape pointclouds, based on a correlation between the geometric information and the semantic information, the probabilistic machine learning model having been trained using training data comprising the metric embeddings of the segmented pointclouds; and controlling a motion of a robot based on the confidence scores for each point of the completed shape pointclouds.

2. The method of claim 1, wherein:

the processor is included in the robot, the partially-observed objects of the scene representation comprise a target object, and the controlling of the motion of the robot comprises controlling at least one of an arm and an end-effector of the robot to enable the robot to grab the target object.

3. The method of claim 1, wherein:

the processor is included in an external device that is provided separately from the robot, the partially-observed objects of the scene representation comprise a target object, and the controlling of the motion of the robot comprises transmitting, to the robot, motion control parameters of at least one of an arm and an end-effector of the robot, causing the robot to grab the target object based on the motion control parameters.

4. The method of claim 1, wherein:

the probabilistic machine learning model is a Gaussian process model, the partially-observed objects of the scene representation comprise a target object, and the generating of the confidence scores comprises generating the confidence scores based on at least one of object properties which indicates whether the target object is fragile and a past robot experience indicating whether the robot previously handled the target object.

5. The method of claim 1, wherein:

the partially-observed objects of the scene representation comprise a target object, and the method further comprises:

identifying a region of the target object having a number of data points in the completed shape pointclouds with corresponding confidence scores lower than a predetermined threshold; and controlling the robot to capture at least one other image of the region of the target object.

6. The method of claim 1, wherein:

the obtaining of the scene representation comprises obtaining the one or more images from a first camera location, and the method further comprises:

filtering out, from the completed shape pointclouds, points having a corresponding confidence score that fail to meet a threshold confidence score, resulting in filtered points of the completed shape pointclouds; and determining, based on the filtered points of the completed shape pointclouds, a second camera location, different from the first camera location, from which to obtain at least one other image of the scene representation that comprises at least one partially-observed portion of the partially-observed objects of the scene representation.

7. The method of claim 6, further comprising:

adjusting the threshold confidence score based on updated confidence scores of the at least one other image.

8. The method of claim 1, wherein the determining of the segmented pointclouds comprises:

extracting the geometric information from image data and the depth information of the one or more images;

estimating the semantic information for each pixel of the one or more images, using the geometric information;

determining an estimation confidence score of the semantic information for each pixel of the one or more images; and combining the semantic information with the depth information, resulting in the segmented pointclouds.

9. The method of claim 1, wherein the determining of the segmented pointclouds comprises:

maintaining a semantic map of the segmented pointclouds comprising the semantic information of the partially-observed objects of the scene representation, the semantic information comprising a semantic class assigned to each of the partially-observed objects; and tracking the partially-observed objects between a first image of the one or more images and a second image of the one or more images, using the semantic information.

10. The method of claim 1, wherein the creating of the metric embeddings of the segmented pointclouds comprises:

providing, to a transformer model, the segmented pointclouds, to obtain embeddings of the segmented pointclouds, the embeddings of the segmented pointclouds comprising the semantic information and the geometric information of the segmented pointclouds; and providing, to a perceptron model, the embeddings of the segmented pointclouds to obtain the metric embeddings of the segmented pointclouds, the metric embeddings of the segmented pointclouds having been forced into a unit-sphere metric space.

11. The method of claim 1, further comprising:

assigning a zero embedding to free space in the metric embeddings of the segmented pointclouds.

12. The method of claim 1, wherein the predicting of the completed shape pointclouds comprises:

providing, to a shape completion model, the one or more images comprising image data and the depth information;

obtaining, from the shape completion model, shape reconstructions of the partially-observed objects of the scene representation, the shape reconstructions being mapped to a coordinate system of an image sensor used to obtain the one or more images; and transforming the shape reconstructions from the coordinate system of the image sensor to a world coordinate system, based on physical configuration information of the image sensor.

13. An apparatus for controlling robot motion, the apparatus comprising:

a memory storing instructions; and a processor communicatively coupled the memory, wherein the processor is configured to execute the instructions to:

obtain a scene representation comprising one or more images, each image of the one or more images comprising depth information;

estimate semantic information of partially-observed objects in the scene representation, based on geometric information extracted from the one or more images;

determine segmented pointclouds of the partially-observed objects in the scene representation based on the semantic information and the geometric information;

create metric embeddings of the segmented pointclouds corresponding to the partially-observed objects of the scene representation;

predict completed shape pointclouds of the partially-observed objects of the scene representation;

generate, using a probabilistic machine learning model, confidence scores for each point of the completed shape pointclouds, based on a correlation between the geometric information and the semantic information, the probabilistic machine learning model having been trained using training data comprising the metric embeddings of the segmented pointclouds; and control a motion of a robot based on the confidence scores for each point of the completed shape pointclouds.

14. The apparatus of claim 13, wherein:

the processor is included in the robot, the partially-observed objects of the scene representation comprise a target object, and the processor is further configured to execute further instructions to control at least one of an arm and an end-effector of the robot to enable the robot to grab the target object.

15. The apparatus of claim 13, wherein:

the apparatus is included in an external device that is provided separately from the robot, the partially-observed objects of the scene representation comprise a target object, and the processor is further configured to execute further instructions to transmit, to the robot, motion control parameters of at least one of an arm and an end-effector of the robot, causing the robot to grab the target object based on the motion control parameters.

16. The apparatus of claim 13, wherein:

the probabilistic machine learning model is a Gaussian process model, the partially-observed objects of the scene representation comprise a target object, and the processor is further configured to execute further instructions to generate the confidence scores based on at least one of object properties which indicates whether the target object is fragile and a past robot experience indicating whether the robot previously handled the target object.

17. The apparatus of claim 13, wherein:

the partially-observed objects of the scene representation comprise a target object, and the processor is further configured to execute further instructions to:

identify a region of the target object having a number of data points in the completed shape pointclouds with corresponding confidence scores lower than a predetermined threshold; and control the robot to capture at least one other image of the region of the target object.

18. The apparatus of claim 13, wherein the processor is further configured to execute further instructions to:

extract the geometric information from image data and the depth information of the one or more images;

estimate the semantic information for each pixel of the one or more images, using the geometric information;

determine an estimating confidence score of the semantic information for each pixel of the one or more images; and combine the semantic information with the depth information, resulting in the segmented pointclouds.

19. The apparatus of claim 13, wherein the processor is further configured to execute further instructions to:

provide, to a transformer model, the segmented pointclouds, to obtain embeddings of the segmented pointclouds, the embeddings of the segmented pointclouds comprising the semantic information and the geometric information of the segmented pointclouds; and provide, to a perceptron model, the embeddings of the segmented pointclouds to obtain the metric embeddings of the segmented pointclouds, the metric embeddings of the segmented pointclouds having been forced into a unit-sphere metric space.

20. A method of evaluating a reliability of three-dimensional (3D) shape predictions, to be performed by a processor, comprising:

creating metric embeddings of segmented pointclouds corresponding to partially-observed objects of a scene representation, based on estimated semantic information of the partially-observed objects and geometric information extracted from the scene representation;

predicting completed shape pointclouds of the partially-observed objects of the scene representation; and generating, using a probabilistic machine learning model, confidence scores for each point of the completed shape pointclouds, based on a correlation between the geometric information and the semantic information.

* * * * *